United States Patent
Toosky

(10) Patent No.: US 7,059,816 B2
(45) Date of Patent: Jun. 13, 2006

(54) NUT PLATE

(75) Inventor: Rahmatollah F. Toosky, San Clemente, CA (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 10/272,721

(22) Filed: Oct. 17, 2002

(65) Prior Publication Data

US 2003/0091408 A1 May 15, 2003

Related U.S. Application Data

(60) Provisional application No. 60/345,105, filed on Nov. 9, 2001.

(51) Int. Cl.
*F16B 37/04* (2006.01)

(52) U.S. Cl. .................. 411/181; 411/71; 411/108

(58) Field of Classification Search .......... 411/69–74, 411/180, 181, 183, 111–113, 120, 108, 452
See application file for complete search history.

(56) References Cited

U.S. PATENT DOCUMENTS

| | | | |
|---|---|---|---|
| 177,665 A * | 5/1876 | Smith .................. 411/120 |
| 1,107,544 A * | 8/1914 | Ogden ................. 411/183 |
| 1,138,345 A | 5/1915 | Zifferer | |
| 1,413,998 A | 4/1922 | Templeton | |
| 1,966,835 A * | 7/1934 | Stites .................. 411/424 |
| 2,078,411 A | 4/1937 | Richardson | |
| 2,146,461 A | 2/1939 | Bettington | |
| 2,150,361 A * | 3/1939 | Chobert ............... 29/512 |
| 2,249,923 A | 7/1941 | Whitcombe | |
| 2,304,107 A | 12/1942 | Leisure | |
| 2,333,386 A | 11/1943 | Murphy | |
| 2,366,956 A * | 1/1945 | Clausen ............... 369/25.01 |
| 2,366,965 A * | 1/1945 | Johnson ............... 411/15 |
| 2,413,669 A | 12/1946 | Whitcombe | |
| 2,421,201 A | 5/1947 | Hallock | |
| 2,438,044 A | 3/1948 | Freesz | |
| 2,477,429 A | 7/1949 | Swanstrom et al. | |
| 2,560,961 A | 7/1951 | Knohl | |

(Continued)

FOREIGN PATENT DOCUMENTS

CH 277209 8/1951

(Continued)

OTHER PUBLICATIONS

Aerospace Fasteners Numerical Listing of Parts 1995 Edition 21pages.

(Continued)

*Primary Examiner*—Flemming Saether
(74) *Attorney, Agent, or Firm*—Trexler, Bushnell, Giangiorgi, Blackstone & Marr Ltd.

(57) ABSTRACT

The invention provides a rivetless nut plate including a nut, a holding bracket having tubular and bracket portions, and a stem having an enlarged head. The stem is positioned within an aperture of the tubular portion such that the head is resting on a shoulder within the bracket aperture. The tubular portion is positioned within an aperture of a workpiece, such that the bracket portion rests on top of the workpiece. The nut is retained within the bracket portion. Force is applied to a bottom of the workpiece and another opposite force is applied to the stem such that the head expands the tubular portion radially outwardly such that lobes on the tubular portion become embedded into the wall of the workpiece, thereby securing the nut plate to the workpiece. The holding bracket could also be formed of two separate elements, a sleeve having a tubular portion and a bracket.

53 Claims, 18 Drawing Sheets

U.S. PATENT DOCUMENTS

| | | | |
|---|---|---|---|
| 2,649,883 A | 8/1953 | Sharp | |
| 2,802,503 A | 8/1957 | Zupa | |
| 2,825,380 A | 3/1958 | Reiner | |
| 2,976,080 A | 3/1961 | Moore | |
| 2,986,188 A | 5/1961 | Karp et al. | |
| 3,025,897 A | 3/1962 | Gieleghem | |
| 3,126,039 A | 3/1964 | Fiddler | |
| 3,177,916 A | 4/1965 | Rosan | |
| 3,180,387 A | 4/1965 | Dzus et al. | |
| 3,305,987 A | 2/1967 | Weaver | |
| 3,316,953 A | 5/1967 | Fransson et al. | |
| 3,537,499 A | 11/1970 | Dey et al. | |
| 3,556,570 A | 1/1971 | Cosenza | |
| 3,566,662 A | 3/1971 | Champoux | |
| 3,657,957 A * | 4/1972 | Siebol | 411/70 |
| 3,670,796 A | 6/1972 | Grimm | |
| 3,695,324 A | 10/1972 | Gulistan | |
| 3,698,278 A * | 10/1972 | Trembley | 411/34 |
| 3,765,078 A | 10/1973 | Gulistan | |
| 3,785,421 A | 1/1974 | Launay | |
| 3,825,146 A | 7/1974 | Hirmann | |
| 4,015,650 A | 4/1977 | Anderson | |
| 4,164,807 A | 8/1979 | King, Jr. | |
| 4,186,787 A | 2/1980 | Husain | |
| 4,187,708 A | 2/1980 | Champoux | |
| 4,193,435 A | 3/1980 | Charles et al. | |
| 4,227,561 A | 10/1980 | Molina | |
| 4,295,766 A | 10/1981 | Shaw | |
| 4,405,256 A | 9/1983 | King, Jr. | |
| 4,423,619 A | 1/1984 | Champoux | |
| 4,425,780 A | 1/1984 | Champoux | |
| 4,471,643 A | 9/1984 | Champoux et al. | |
| 4,557,033 A | 12/1985 | Champoux | |
| 4,557,650 A | 12/1985 | Molina | |
| 4,695,212 A | 9/1987 | Berecz | |
| 4,732,518 A | 3/1988 | Toosky | |
| 4,762,451 A | 8/1988 | Collins | |
| 4,768,907 A | 9/1988 | Gauron | |
| 4,781,501 A | 11/1988 | Jeal et al. | |
| 4,790,701 A | 12/1988 | Baubles | |
| 4,826,374 A | 5/1989 | Baglin | |
| 4,828,440 A | 5/1989 | Anderson et al. | |
| 4,830,557 A | 5/1989 | Harris et al. | |
| 4,863,327 A | 9/1989 | Poupiter | |
| 4,875,816 A | 10/1989 | Peterson | |
| 4,884,420 A | 12/1989 | Finkel et al. | |
| 4,885,829 A | 12/1989 | Landy | |
| 4,895,484 A | 1/1990 | Wilcox | |
| 4,934,170 A | 6/1990 | Easterbrook et al. | |
| 4,934,886 A | 6/1990 | Aikens | |
| 5,066,180 A | 11/1991 | Lang et al. | |
| 5,078,294 A | 1/1992 | Staubli | |
| 5,083,363 A | 1/1992 | Ransom et al. | |
| 5,096,349 A | 3/1992 | Landy et al. | |
| 5,096,350 A | 3/1992 | Peterson | |
| 5,103,548 A | 4/1992 | Reid et al. | |
| 5,127,254 A | 7/1992 | Copple et al. | |
| 5,146,668 A | 9/1992 | Gulistan | |
| 5,193,643 A | 3/1993 | McIntyre | |
| 5,245,743 A | 9/1993 | Landy et al. | |
| 5,305,627 A | 4/1994 | Quincey et al. | |
| 5,341,559 A | 8/1994 | Reid et al. | |
| 5,380,135 A | 1/1995 | Copple et al. | |
| 5,405,228 A | 4/1995 | Reid et al. | |
| 5,433,100 A | 7/1995 | Easterbrook et al. | |
| 5,468,104 A | 11/1995 | Reid et al. | |
| 5,630,686 A | 5/1997 | Billmann | |
| 5,704,747 A * | 1/1998 | Hutter et al. | 411/70 |
| 5,716,178 A | 2/1998 | Vu | |
| 5,893,694 A | 4/1999 | Wilusz et al. | |
| 5,947,518 A | 9/1999 | Redman et al. | |
| 6,077,010 A | 6/2000 | Reid et al. | |
| 6,146,071 A | 11/2000 | Norkus et al. | |
| 6,183,180 B1 | 2/2001 | Copple et al. | |

FOREIGN PATENT DOCUMENTS

FR        2740184        4/1997

OTHER PUBLICATIONS

Fatigue Improvement by Sleeve Coldworking by Joseph L. Phillips, Oct. 1973—13 pages.

* cited by examiner

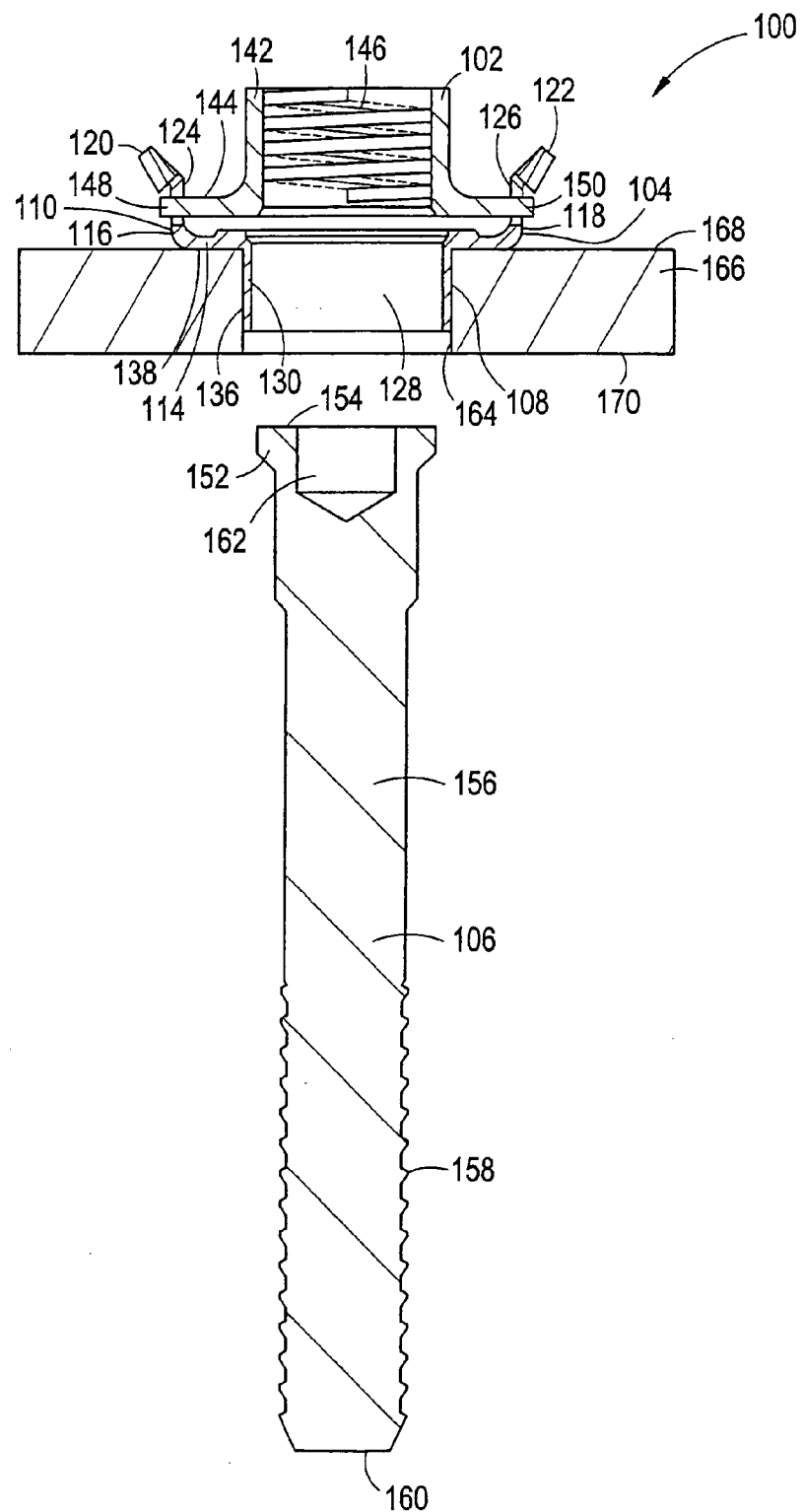

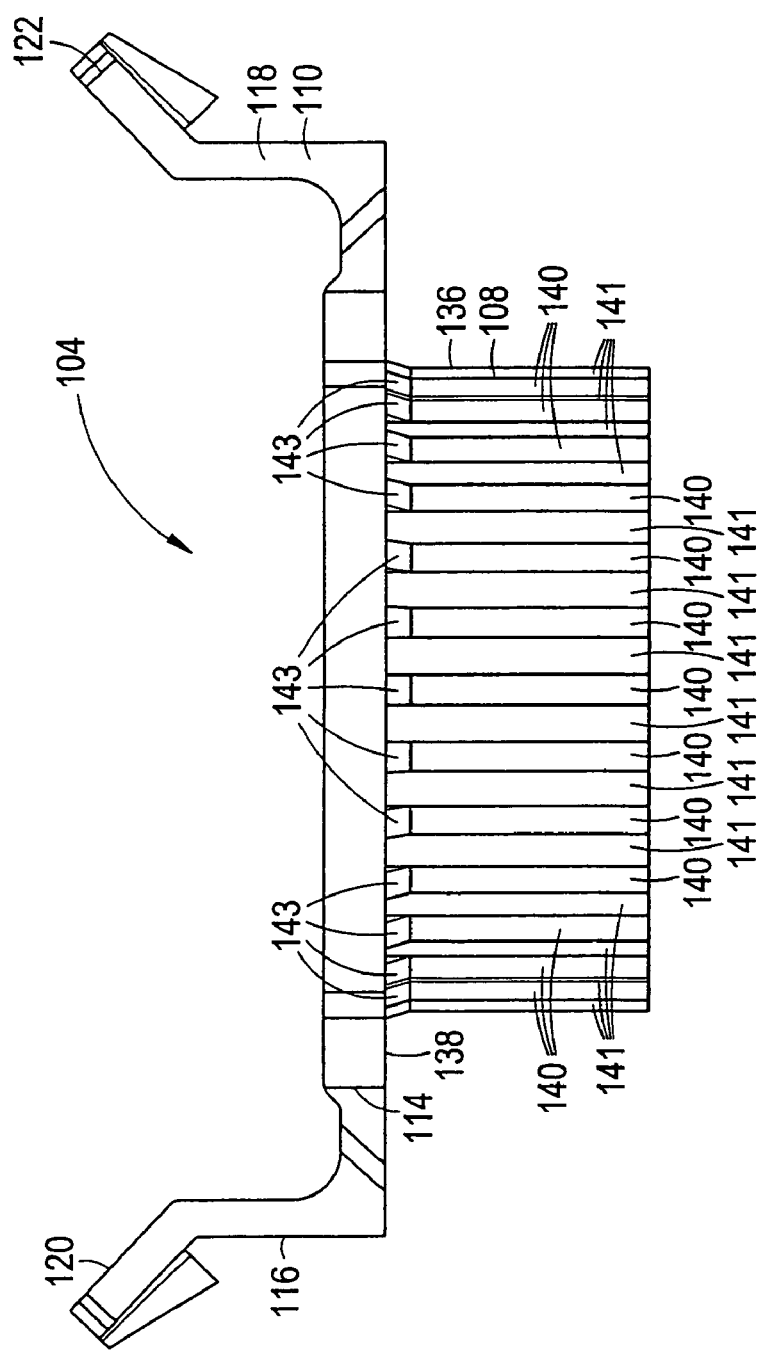

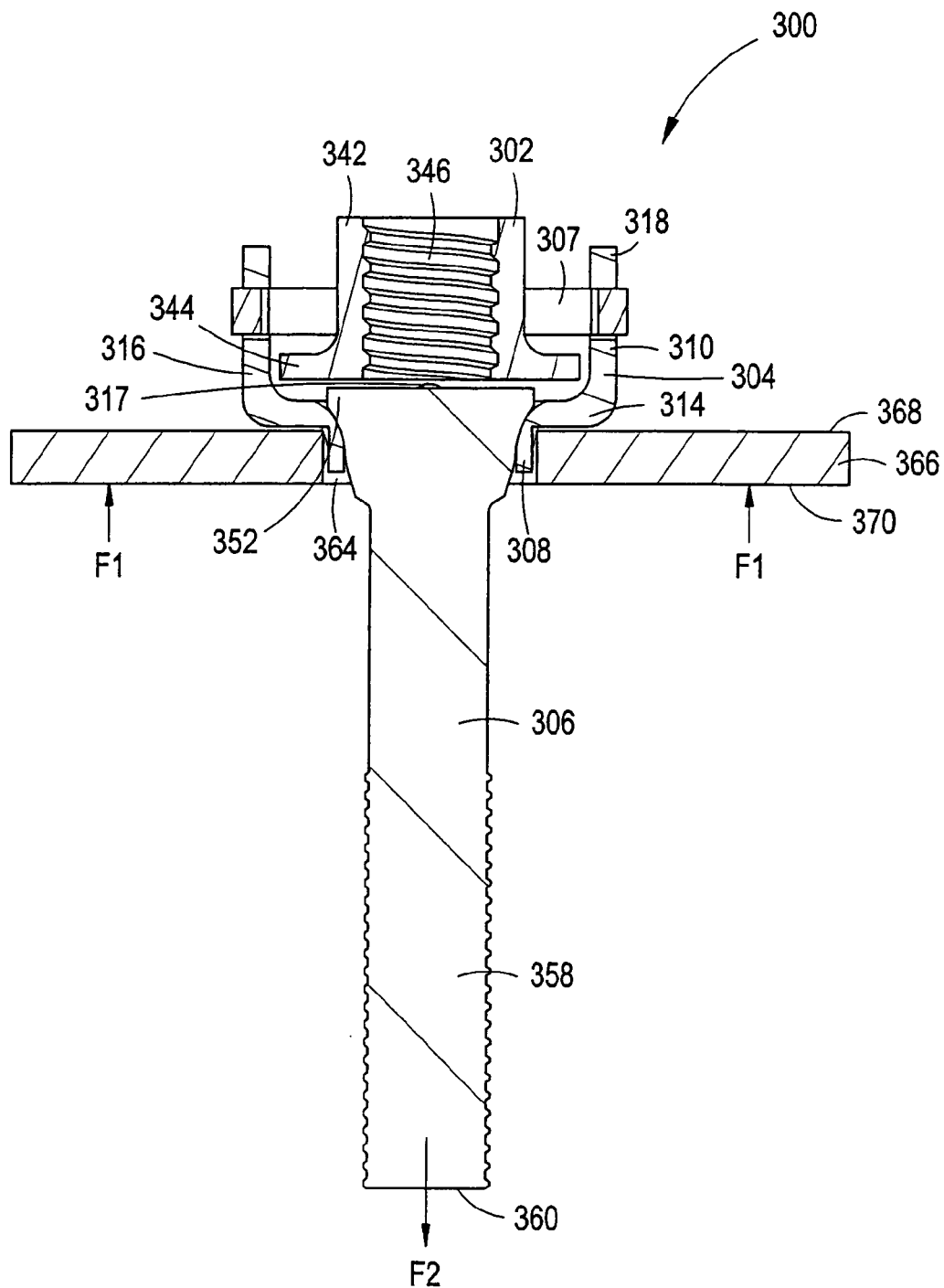

NUT PLATE

CROSS-REFERENCE

This patent application claims the benefit of domestic priority of U.S. Provisional Application Ser. No. 60/345,105, filed Nov. 9, 2001, and entitled "Nutplate".

BACKGROUND OF THE INVENTION

The present invention relates to a rivetless nut plate typically used in the aerospace industry.

Nut plates are used for attaching structural and non-structural components together in both aerospace and commercial applications. There are many different design configurations of nut plates being used today. Two major classes are riveted nut plates and flared rivetless nut plates.

In riveted nut plates, two or more rivets are employed for attaching the body of the nut plates to the workpiece.

Rivetless nut plates are composed fundamentally of three components: a nut element, a holding bracket, and an attachment sleeve. The method of attachment and fixing of these nut plates to workpieces is based on two major features:

(1) The insertion of the sleeve into an aperture of a workpiece by pressing in or pulling down the bracket sleeve assembly into the aperture of the workpiece. Serration/lobe features on the sleeve interfere with walls of the workpiece to provide resistance against the rotation of the nut plate.

(2) After insertion of the sleeve into the aperture of the workpiece, an end of the sleeve is flared against the opposite side of the workpiece providing resistance against push-out forces that are encountered during usage of the nut plate.

One example of this type of rivetless nut plate is embodied in U.S. Pat. No. 4,732,518 which illustrates the insertion of a sleeve inside a workpiece against heavy interference forces and then deformation of the sleeve to produce flaring of the end of the sleeve. The sleeve has a serration/lobe configuration thereon with the serration/lobe configuration being long and tapered such that the serrations/lobes extend into the walls of the workpiece. The tapered feature, length and specific geometry are necessary to make installation possible with the method of installation which was chosen for its application. The main object of the '518 patent with its tapered and extended serration/lobe configuration was to enhance the fatigue life of the workpiece by distributing the load throughout the workpiece and providing expansion due to the insertion of the sleeve into the workpiece, and to cold work the material adjacent the perimeter of the workpiece aperture.

The installation of rivetless nut plates with tooling of present designs, however, such as those discussed in U.S. Pat. No. 4,732,518, is cumbersome, slow, complicated, costly and often non-functional. Also, the hole preparation needs to be precise and requires countersinking or counterboring for flush installation. These shortcomings have limited the usage of rivetless nut plates.

The flaring of rivetless nut plates is also disadvantageous for many reasons, such as complicated tooling, special aperture preparation (such as counter-bore and counter-sink) to achieve flush installation, grip length limitations, the creation of gaps between the sleeve and the walls of the workpiece, and longer length, thus making the rivetless nut plate a relatively heavy component.

Four other rivetless nut plate designs are illustrated in U.S. Pat. Nos. 5,096,349, 5,245,743, 5,405,228 and 5,704,747, which were designed to avoid flaring, but each has disadvantages associated therewith. The design of U.S. Pat. No. 5,704,747, relies on adhesive for attaching the nut plate to the structure. The designs of U.S. Pat. Nos. 5,096,349, 5,245,743 and 5,405,228 do not have adhesives or lobes which are used to fix the nut plate within the structure. These designs rely on heavily cold-worked holes and high interference engagement utilizing a hardened pin as the installation tool to expand the sleeve portion into the structure. The sleeve is smooth and because of high level expansion, the friction of forces created is supposed to retain the nut plate and provide expected mechanical properties. The fundamental purpose for design of this fastener is to enhance mechanical fatigue properties of the joint. The parts for this design are very expensive, installation is costly and cumbersome, and hole preparation needs to be very precise. Thus, the overall cost of this design is very high and application is thereby limited. There are also reports in the field that because of the required heavy expansion the receiving structure can deform beyond acceptable limits, thereby causing damage and rejection of the hole structure.

Thus, there is a need for a rivetless nut plate design which overcomes the disadvantages of the prior art rivetless nut plate designs. The present invention provides for such a rivetless nut plate design.

OBJECTS AND SUMMARY OF THE INVENTION

A primary object of the invention is to provide a rivetless nut plate which will simplify the installation of rivetless nut plates to workpieces.

An object of the invention is to provide a rivetless nut plate which utilizes a novel tooling concept to speed up the installation of the nut plate to the workpiece and which ensures proper engagement of the sleeve of the nut plate to the workpiece.

Another object of the invention is to provide a rivetless nut plate which will greatly expand the usage of rivetless nut plate in aerospace applications as well as in commercial industry.

Yet another object of the invention is to provide a rivetless nut plate which satisfies the specified requirements of torque-out, which is the ability to resist the specified twisting torque acted upon the nut plate around the axis of the hole.

Still another object of the invention is to provide a rivetless nut plate which satisfies the specified requirements of push-out, which is the ability to resist a specified applied force along the axis of the hole.

Another object of the invention is to provide a rivetless nut plate which satisfies the specified requirements of fatigue, which is the installation characteristic which renders the receiving structure resistance to dynamic loading.

Still another object of the invention is to provide a rivetless nut plate which combines the bracket and sleeve component into a single component, thereby reducing one part, in order to greatly simplify component assembly, reduce overall cost, and improve functional and mechanical properties.

Yet another object of the invention is to provide a rivetless nut plate which does not allow for gaps to be formed between the sleeve portion of the nut plate and the walls of the workpiece upon installation of the rivetless nut plate.

Another object of the invention is to provide a rivetless nut plate which expands the sleeve within the aperture of a workpiece to ensure intimate contact with the workpiece throughout the aperture and which induces residual compressive stresses which would enhance the fatigue life of the workpiece.

Yet another object of the invention is to provide a rivetless nut plate in which the nut may be easily replaced by another nut if the first nut is worn.

Still another object of the invention is to provide lobes or ribs on the outer wall of a tubular portion inserted into an aperture of the workpiece which will help provide improved push-out, torque-out and fatigue characteristics.

Briefly, and in accordance with the foregoing, the invention provides three embodiments of a novel nut plate.

The first embodiment of the invention provides a nut plate which includes a nut, a holding bracket and a stem. The holding bracket has a tubular portion and a bracket portion. The tubular portion has an aperture therethrough which defines an inner wall which is tapered and which defines a shoulder. The tubular portion has an outer wall with lobes extending therefrom. The bracket portion extends from the tubular portion and has a pair of opposing sidewalls with flanges extending therefrom and slots provided therethrough. The nut has a base portion with tabs extending from opposing sides thereof and a cylindrical portion with a threaded aperture therethrough extending upwardly therefrom. The stem has an enlarged deformable head portion and an elongated cylindrical portion extending therefrom. In operation, the stem is inserted into the aperture of the tubular portion such that the enlarged head portion rests on the shoulder. The nut is then inserted into the bracket portion of the holding bracket such that the tabs of the nut are positioned within the slots of the bracket portion to secure the nut and to allow float movement of the nut both laterally and longitudinally relative to the bracket portion. The tubular portion is then inserted into an aperture of a workpiece such that the bracket portion rests on top of the workpiece. The stem is then pulled through the aperture of the tubular portion to expand the tubular portion into the wall defined by the aperture of the workpiece. The lobes on the outer wall of the tubular portion are embedded into the wall of the workpiece to improve push-out and torque-out. As the head portion of the stem is pulled through the aperture of the tubular portion, the head will deform to assume the geometry relevant to the expanded size of the expanded inner wall of the tubular portion. Once pulled entirely through the aperture, the tubular portion is fixedly connected to the workpiece and the stem can be discarded.

The second embodiment of the invention provides a nut plate which includes a nut, a bracket, a sleeve, and a stem. The nut plate of the second embodiment is basically identical to the nut plate of the first embodiment except that the holding bracket of the first embodiment is provided in two separate pieces, namely, the bracket and the sleeve with the sleeve being similar to the tubular portion of the holding bracket and the bracket being similar to the bracket portion of the holding bracket. Operation of attachment of the nut plate of the second embodiment is performed in virtually the same manner as attachment of the nut plate of the first embodiment.

The third embodiment of the invention provides a nut plate which includes a nut, a holding bracket, a stem and a retainer. The holding bracket has a tubular portion and a bracket portion. The tubular portion has an aperture therethrough which defines an inner wall which is tapered and which defines a shoulder. The inner wall may also have a lip extending therefrom. The tubular portion has an outer wall with lobes extending therefrom. The lobes are a series of high and low lobes with the high lobes having an angled portion proximate to the bracket portion. The bracket portion extends from the tubular portion and has a base with protrusions extending therefrom and a pair of opposing sidewalls extending therefrom having slots provided therethrough. The nut has a base portion with recesses at opposing ends thereof and a cylindrical portion with a threaded aperture therethrough extending upwardly therefrom. The stem has an enlarged deformable head portion and an elongated cylindrical portion extending therefrom. The retainer is preferably a spring member which can be fitted into the slots of the bracket portion. In operation, the stem is inserted into the aperture of the tubular portion such that the enlarged head portion rests on the shoulder. The nut is then inserted into the bracket portion of the holding bracket such that the recesses of the nut receive the protrusions on the base of the bracket portion. The retainer is then positioned within the slots of the opposing sidewalls of the bracket portion such that the nut is retained between the retainer and the bracket portion, but is allowed to float both laterally and longitudinally. The tubular portion is then inserted into an aperture of a workpiece such that the bracket portion rests on top of the workpiece. The stem is then pulled through the aperture of the tubular portion to expand the tubular portion into the wall defined by the aperture of the workpiece. The high and low lobes on the outer wall of the tubular portion are embedded into the wall of the workpiece to improve push-out and torque-out, the high lobes moving material to the low lobes such that the low lobes create a seal with the wall of the workpiece. As the head portion of the stem is pulled through the aperture of the tubular portion, the head will deform to assume the geometry relevant to the expanded size of the expanded inner wall of the tubular portion. Once pulled entirely through the aperture, the tubular portion is fixedly connected to the workpiece and the stem can be discarded.

BRIEF DESCRIPTION OF THE DRAWINGS

The features of the invention which are believed to be novel are described in detail hereinbelow. The organization and manner of the structure and operation of the invention, together with further objects and advantages thereof, may best be understood by reference to the following description taken in connection with the accompanying drawings wherein like reference numerals identify like elements in which:

FIGS. 1a–1c are side elevational cross-sectional views of the nut plate of a first embodiment of the invention being attached to the workpiece;

FIG. 2 is a side elevational view of a holding bracket of the nut plate of the first embodiment of the invention;

FIGS. 12a–12c are side elevational cross-sectional views of the nut plate of the third embodiment of the invention being attached to the workpiece;

DETAILED DESCRIPTION OF THE ILLUSTRATED EMBODIMENT

Figure 1A:
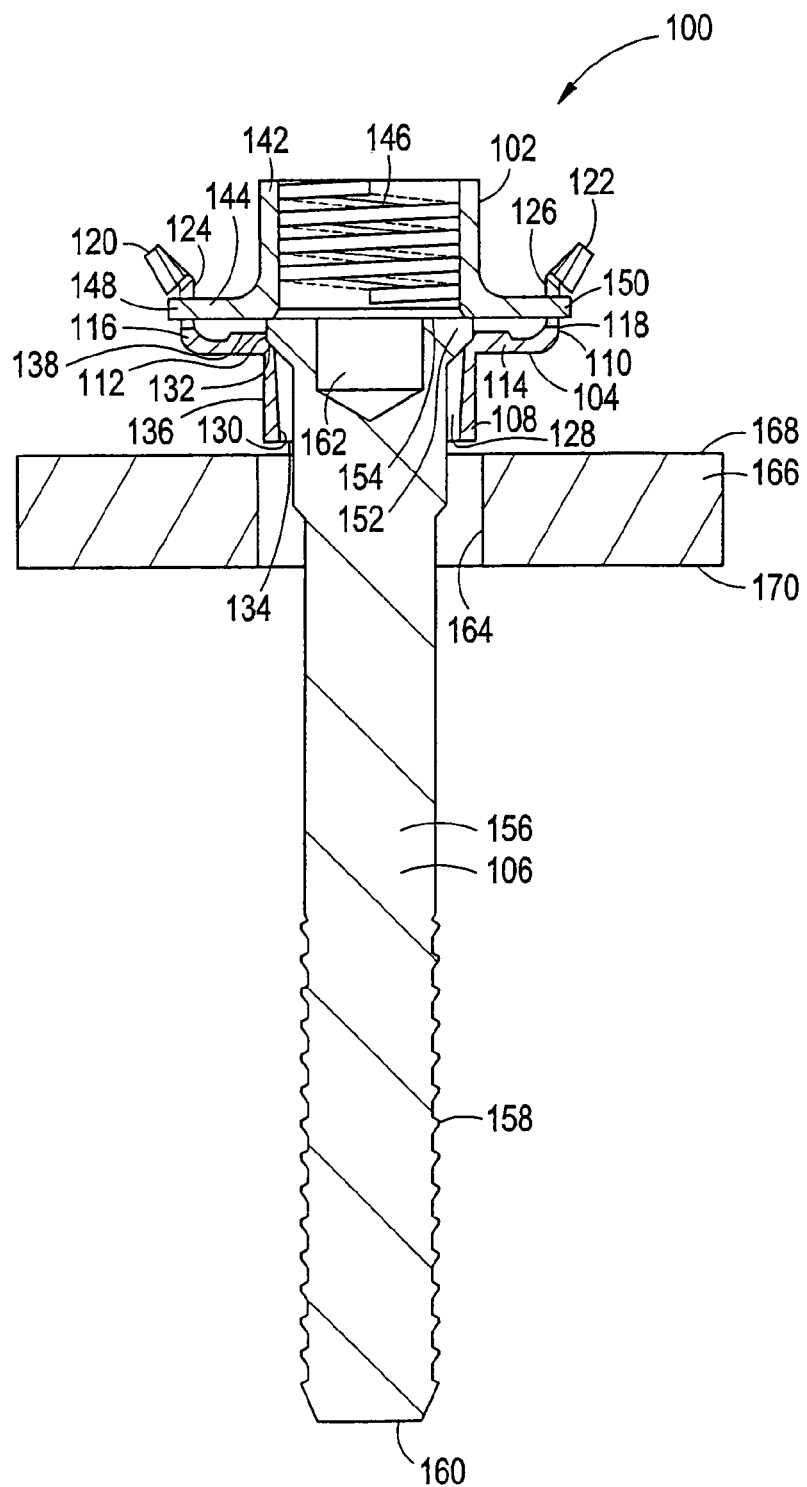

While this invention may be susceptible to embodiment in different forms, there is shown in the drawings and will be described herein in detail, specific embodiments with the understanding that the present disclosure is to be considered an exemplification of the principles of the invention, and is not intended to limit the invention to that as illustrated.

Figure 5:
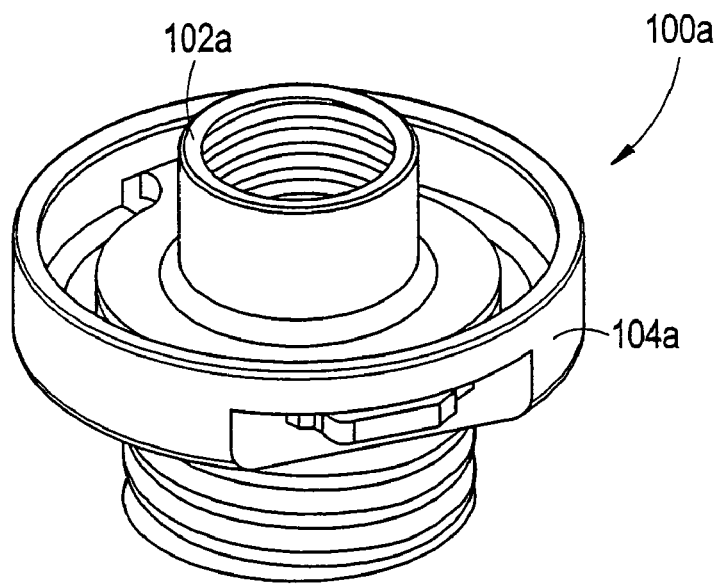
FIG. 5 is a perspective view of an alternative design of the nut plate of the first embodiment of the invention.
Figure 6:
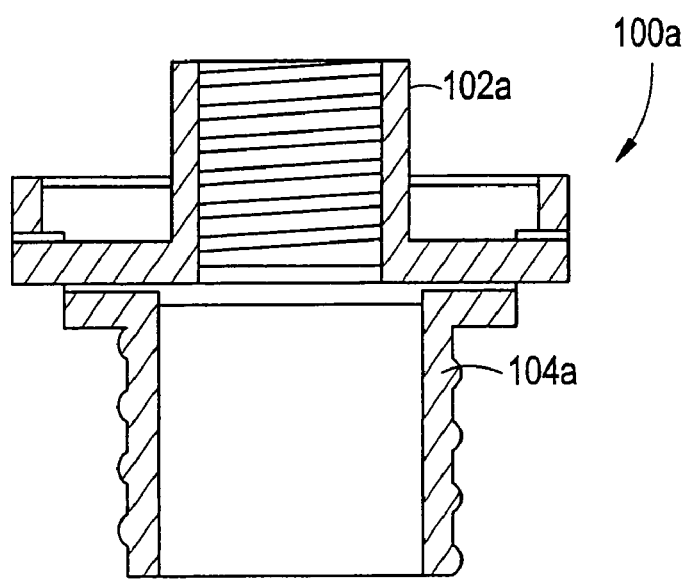
FIG. 6 is a side elevational cross-sectional view of the alternative design of the nut plate as illustrated in FIG. 5.
Figure 7:
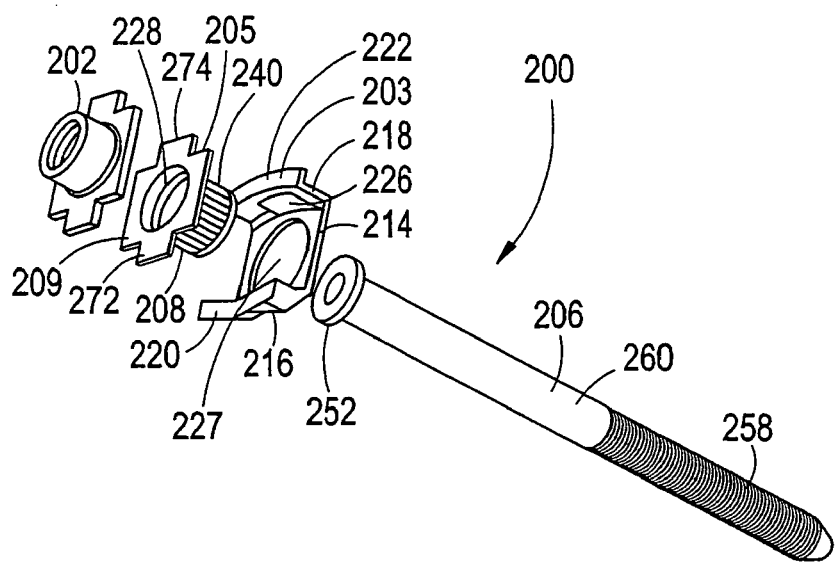
FIG. 7 is an exploded perspective view of the nut plate of a second embodiment of the invention.
Figure 8:
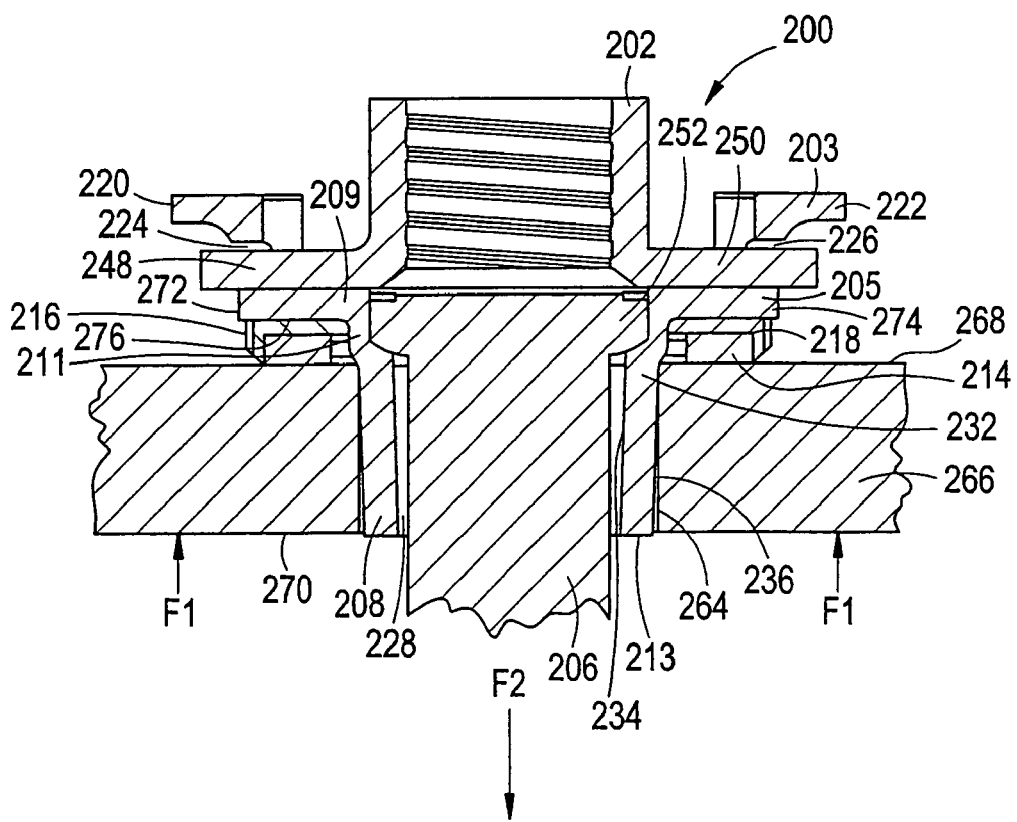
FIG. 8 is a side elevational cross-sectional view of the nut plate of the second embodiment of the invention positioned within a workpiece prior to attachment of the nut plate to the workpiece.
Figure 9:
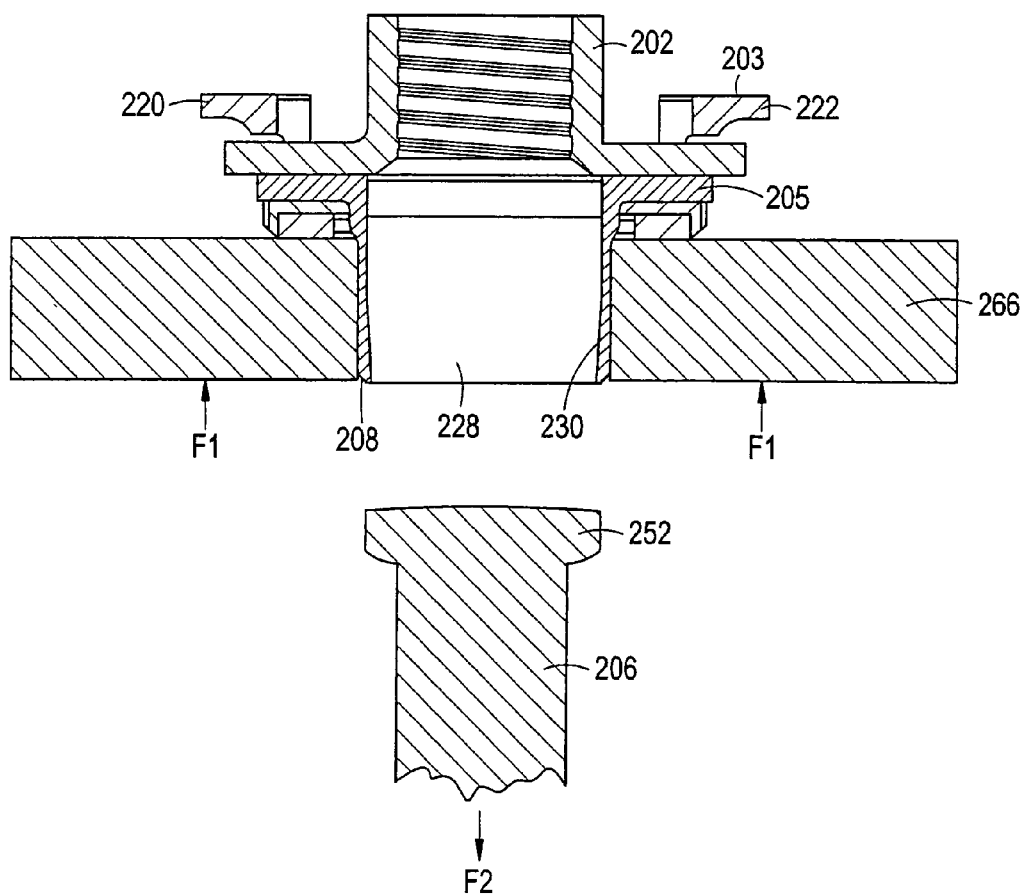
FIG. 9 is a side elevational cross-sectional view of the nut plate of the second embodiment of the invention positioned within a workpiece after attachment of the nut plate to the workpiece.

A first embodiment of a nut plate 100 is shown in FIGS. 1–6, a second embodiment of the nut plate 200 is shown in FIGS. 7–9, and a third embodiment of the nut plate 300 is shown in FIGS. 10–16. Like elements are denoted with like reference numerals with the first embodiment being in the one hundreds, the second embodiment being in the two hundreds, and the third embodiment being in the three hundreds.

Attention is now directed to the nut plate 100 of the first embodiment of the invention as illustrated in FIGS. 1–6. The nut plate 100 of the first embodiment includes a nut 102, a holding bracket 104 and a stem 106.

Figure 3:
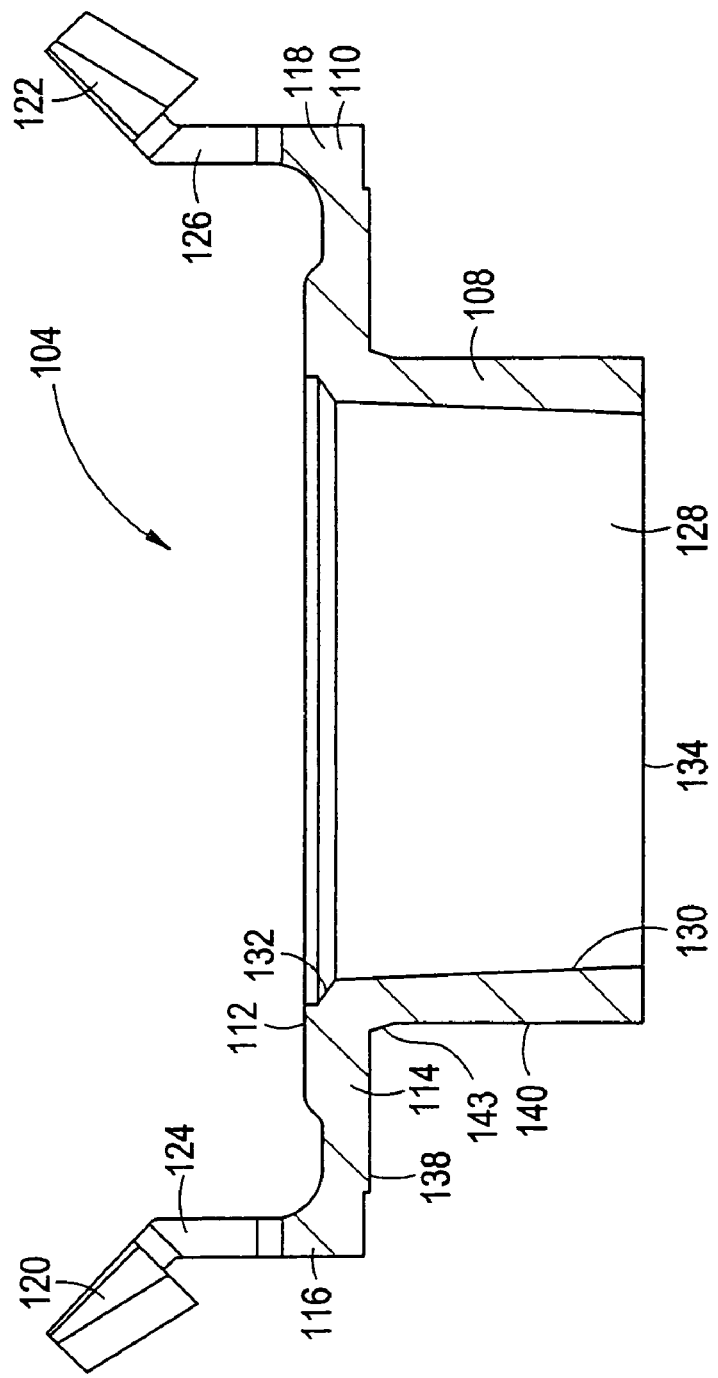
FIG. 3 is a side elevational cross-sectional view of the holding bracket of the nut plate of the first embodiment of the invention.

As best illustrated in FIGS. 2–3, the holding bracket 104 is generally Y-shaped in side elevation and includes a tubular portion 108 and a bracket portion 110 which extends outwardly from the tubular portion 108 at a first end 112 thereof. The bracket portion 110 includes a base portion 114 and opposed upstanding side walls 116, 118. Flanges 120, 122 extend from upper ends of the side walls 116, 118 and project outwardly therefrom. Slots 124, 126 extend through the side walls 116, 118 of the bracket portion 110. The side walls 116, 118 and flanges 120, 122 are preferably formed of a resilient material.

The tubular portion 108 extends in the opposite direction from the base portion 114 of the bracket portion 110 than do the side walls 116, 118 of the bracket portion 110. The tubular portion 108 has an aperture 128 therethrough which defines an inner wall 130 of the tubular portion 108. The tubular portion 108 also has an outer wall 136. At the first end 112 of the tubular portion 108, the inner wall 130 defines a first inner diameter of the aperture 128. At a minimal distance from the first end 112 of the tubular portion 108, the inner wall 130 tapers inwardly to provide a shoulder 132 and to define a second inner diameter of the aperture 128 and thus a wall thickness of the tubular portion 108 between the outer wall 136 and the shoulder 132. The wall thickness of the tubular portion 108 between the outer wall 136 and the shoulder 132 is preferably 0.010 inches. The second inner diameter of the aperture 128 at the shoulder 132 of the tubular portion 108 is smaller than the first inner diameter of the aperture 128 at the first end 112 of the tubular portion 108. From the shoulder 132 to a second end 134 of the tubular portion 108, the inner wall 130 is tapered or stepped such that the inner wall 130 at the second end 134 of the tubular portion 108 defines a third inner diameter and thus a wall thickness of the tubular portion 108 at the second end 134 of the tubular portion 108. The wall thickness of the tubular portion 108 at the second end 134 of the tubular portion 108 is preferably 0.014 inches and, thus, is larger than the wall thickness of the tubular portion 108 between the outer wall 136 and the shoulder 132 of the tubular portion 108. The third inner diameter of the aperture 128 at the second end 134 of the tubular portion 108 is smaller than the second inner diameter of the aperture 128 at the shoulder 132 of the tubular portion 108.

Figure 4A:
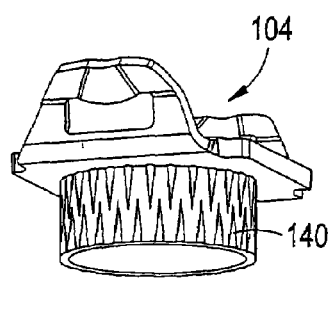
FIGS. 4a–4g are perspective views of the holding bracket of the nut plate of the first embodiment of the invention each having a different configuration for the lobes or ribs on an outside wall of a tubular portion.
Figure 4B:
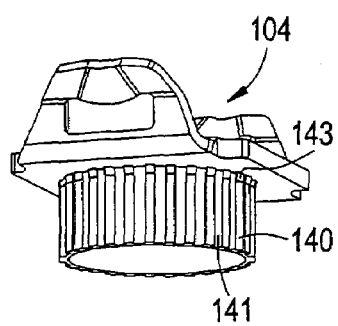
Figure 4C:
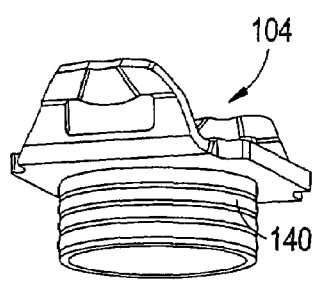
Figure 4D:
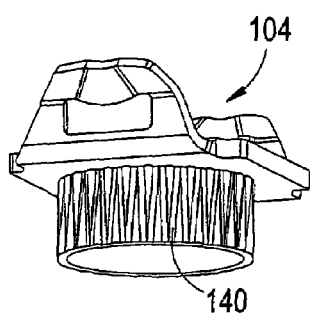
Figure 4E:
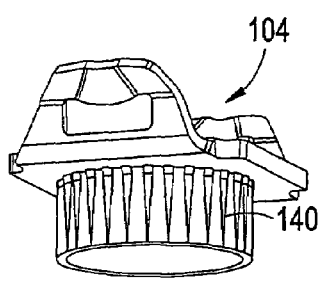
Figure 4F:
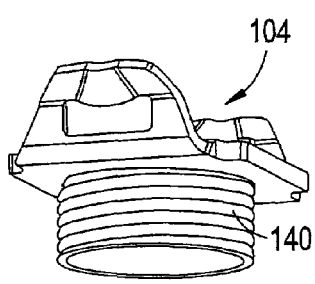
Figure 4G:
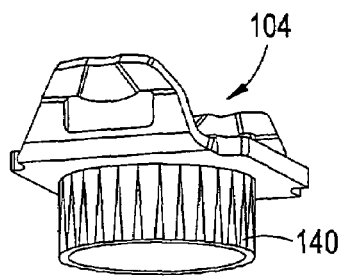

The outer wall 136 of the tubular portion 108 extends from an undersurface 138 of the bracket portion 110 to the second end 134 of the tubular portion 108. Lobes or ribs 140 extend outwardly from the outer wall 136 of the tubular portion 108. The lobes 140 can be formed in many different configurations on the outer wall 136, such as axially straight, tilted or helical, as illustrated in FIGS. 4a–4g. Preferably, the lobes 140 are formed as illustrated in FIGS. 2 and 4b, with the lobes 140 being axially straight along the outer wall 136. Adjacent lobes 140 are positioned apart from one another such that gaps 141 are provided between adjacent lobes 140. The lobes 140 also have an angled portion 143 proximate to the undersurface 138 of the bracket portion 110 such that the lobes 140 are thicker proximate to the undersurface 138 of the bracket portion 110. The angled portions 143 of the lobes 140 provide for improved torque of the bracket portion 110.

Figure 1B:
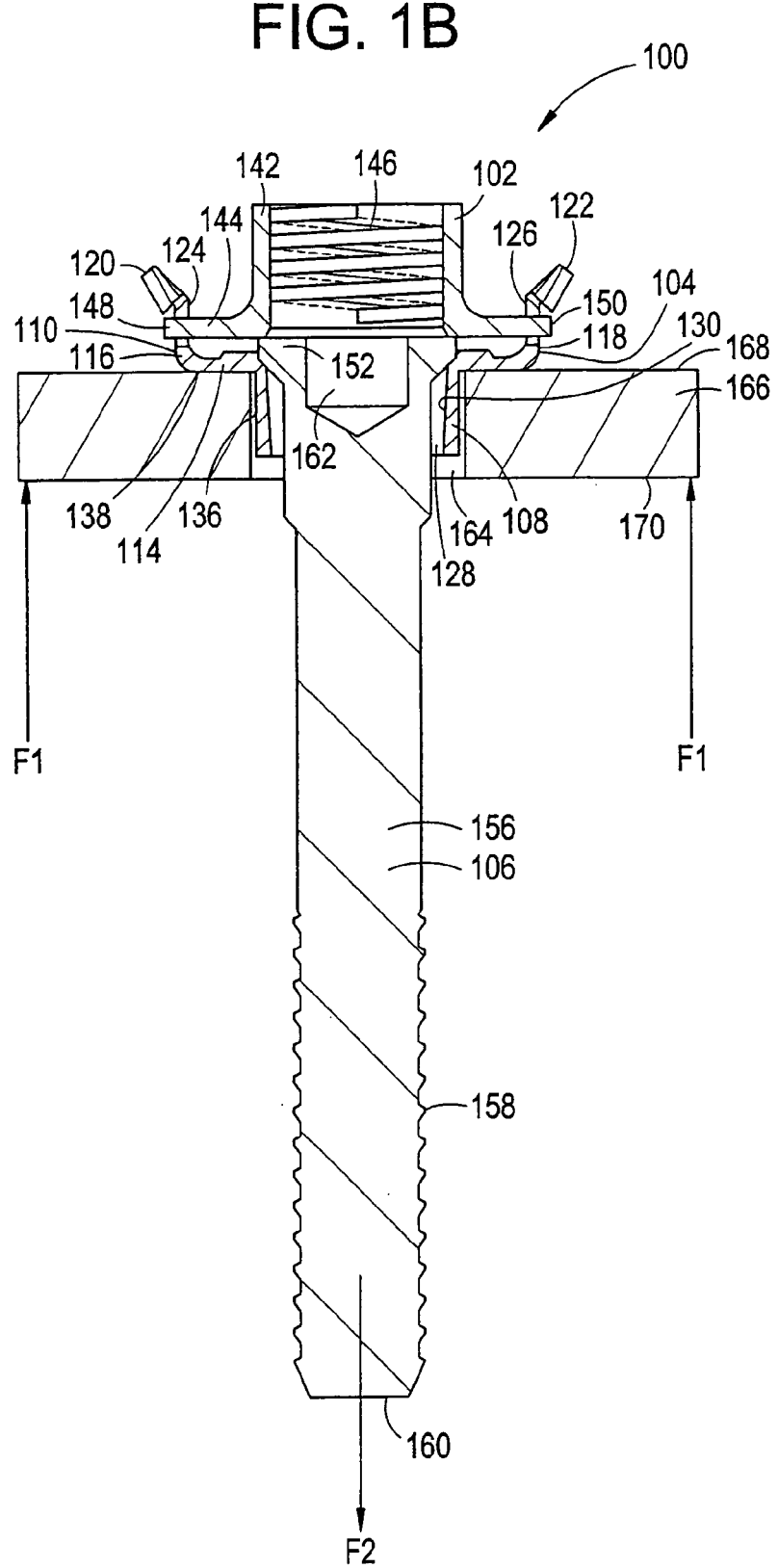

As illustrated in FIGS. 1a–1c, the nut 102 includes a cylindrical portion 142 and a flat base portion 144 which extends outwardly from the cylindrical portion 142 at one end thereof. The cylindrical portion 142 has an aperture 146 therethrough which defines an inner diameter of the cylindrical portion 142. The cylindrical portion 142 at the inner diameter is generally threaded such that a workpiece, such as a bolt, can be attached thereto. The flat base portion 144 further defines tabs or wings 148, 150 that extend radially outwardly in opposite directions. The tabs 148, 150 fit within the slots 124, 126 of the bracket portion 110 of the holding bracket 104, such that the nut 102 is retained against the holding bracket 104 to prevent substantial movement between the nut 102 and the holding bracket 104. The tabs 148, 150 are smaller in size than the slots 124, 126 in order to allow the nut 102 limited floating movement relative to the holding bracket 104.

As illustrated in FIGS. 1a–1c, the stem 106 includes an enlarged head portion 152 at a first end 154 thereof and an elongate cylindrical portion 156 which extends from the enlarged head portion 152. The enlarged head portion 152 has a diameter which is smaller than the first inner diameter of the tubular portion 108 but larger than the second inner diameter of the tubular portion 108. The enlarged head portion 152 tapers to the cylindrical portion 156, which has a diameter that is smaller than the third inner diameter of the tubular portion 108. The cylindrical portion 156 has a tool engaging section 158 proximate to a second end 160 of the stem 106. The enlarged head portion 152 may have a cavity 162 provided therein to help in the deformation of the enlarged head portion 152, as will be discussed further herein, although the cavity 162 need not be provided to deform the enlarged head portion 152.

In operation, the second end 160 of the stem 106 is inserted into the aperture 128 of the tubular portion 108 of the holding bracket 104 at the first end 112 thereof until the enlarged head portion 152 of the stem 106 meets resistance from the shoulder 132 of the inner wall 130 of the tubular portion 108, as illustrated in FIG. 1a.

The nut 102 is then connected to the holding bracket 104 by deflecting outwardly the flanges 120, 122 and the side walls 116, 118 of the holding bracket 104 and inserting the tabs 148, 150 of the nut 102 into the slots 124, 126 of the side walls 116, 118. The flanges 120, 122 and the side walls 116, 118 are then allowed to return to their normal position, thus connecting the nut 102 to the holding bracket 104, allowing for floating movement of the nut 102 relative to the holding bracket 104, as illustrated in FIG. 1a.

The tubular portion 108 of the holding bracket 104 is then inserted into an aperture 164 of a workpiece 166, such that the undersurface 138 of the bracket portion 110 of the holding bracket 104 sits on a top surface 168 of the workpiece 166, as illustrated in FIG. 1b. The aperture 164 has a diameter which is slightly larger than a diameter of the tubular portion 108 of the holding bracket 104. The aperture 164 has a length which is larger than or equal to a length of the tubular portion 108 of the holding bracket 104 such that the tubular portion 108 does not extend beyond the aperture 164 of the workpiece 166.

A holding or abutment force F1 is applied to a bottom surface 170 of the workpiece 166 and a tool (not shown) engages the tool engaging section 158 of the stem 106 and applies a force F2 to the stem 106 which is directed axially and in the opposite direction than the force F1 is applied to the workpiece 166, as illustrated in FIG. 1b. The force F2 on the stem 106 seats the tubular portion 108 and the bracket portion 110 of the holding bracket 104 firmly against and within the workpiece 166.

Upon application of force F2 to the stem 106, the enlarged head portion 152 meets resistance from the shoulder 132 of the inner wall 130 such that the inner wall 130 is forced to expand radially outwardly as the enlarged head portion 152 deforms to the size of the expanded inner wall 130, with assistance from the cavity 162 in the enlarged head portion 152, if provided. As the inner wall 130 of the tubular portion 108 is inwardly tapered or stepped from the shoulder 132 to the second end 134 of the tubular portion 108, the enlarged head stem 152 will consistently have an outer diameter which is larger than the diameter of the inner wall 130 of the tubular portion 108, even though the enlarged stem head 152 deforms to assume the geometry relevant to the size of the expanded inner wall 130 of the tubular portion 108. Thus, the axial force F2 applied to the enlarged stem head 152 will place a continuous exertion of radial expansion on the inner wall 130 of the tubular portion 108. As the inner wall 130 is continuously expanded by the enlarged head portion 152, the outer wall 136 of the tubular portion 108 continuously expands radially outwardly within the aperture 164 against the wall of the workpiece 166, thus embedding the lobes 140 in the wall of the workpiece in a fixed and intimate engagement with the wall of the aperture 164. The angled portions 143 of the lobes 140 embed further into the wall of the workpiece 166 to provide improved torque-out of the holding bracket 104. When the enlarged head portion 152 is pulled completely through the aperture 128 of the tubular portion 108, the holding bracket 104 is attached to the workpiece 166, as illustrated in FIG. 1c, and the stem 106 can be discarded. A workpiece, such as a bolt, can then be attached to the nut plate 100.

The enlarged head portion 152 of stem 106 will initially expand the tubular portion 108 as well as place a compressive load on the components to seat them against the upper surface 168 of the workpiece 166. The tubular portion 108 will expand to engage the wall of the aperture 164 in the workpiece 166. As this occurs, radial forces are established which are sufficient to deform the head portion 152 radially. Thus, the head portion 152 can handle tolerance variations in the workpiece aperture 164, and will continuously deform the tubular portion 108 radially outward to engage the aperture wall with sufficient force to cause the lobes 140, or alternate structure, on the outer wall 136 of tubular portion 108 to embed in the wall of the aperture 164. As can be appreciated, the increasing wall thickness of the tubular portion 108 insures that radial deformation continues along the entire length of tubular portion 108 to attain the desired degree of engagement of the lobes 140 in the wall of the aperture 164 such that improved torque-out, push-out and fatigue characteristics are achieved.

An alternative design of the nut plate 100 of FIGS. 1–4 is illustrated in FIGS. 5–6 and is referenced as nut plate 100a. The nut plate 100a includes a nut 102a, a holding bracket 104a, and a stem (not shown).

Attention is now directed to the second embodiment of the nut plate 200 as illustrated in FIGS. 7–9. The nut plate 200 of the second embodiment includes a nut 202, a bracket 203, a sleeve 205, and a stem 206. As the nut 202 and the stem 206 of the nut plate 200 are identical in structure to the nut 102 and stem 106 of the nut plate 100 of the first embodiment, these components will not be described again herein with the understanding that the description of the nut 202 is identical to the nut 102 and the description of the stem 206 is identical to the stem 106. Like reference numerals will denote like elements. In effect, the bracket 203 and the sleeve 205 are separate components in this embodiment, whereas they are unitary in the previous embodiment as the holding bracket 104. Thus, the bracket 203 and the sleeve 205 combine to form a holding bracket 204.

The bracket 203 of the nut plate 200 is generally U-shaped in side elevation and includes a base portion 214 and opposed upstanding side walls 216, 218. Flanges 220, 222 extend from upper ends of the side walls 216, 218 and project outwardly therefrom. Slots 224, 226 extend through the side walls 216, 218 of the bracket 203. The side walls 216, 218 and the flanges 220, 222 are preferably formed of a resilient material. A relatively large circular opening 227 is formed at a center of the base portion 214.

The sleeve 205 includes a tubular portion 208 and a head 209 that extends perpendicular to the tubular portion 208 at a first end 211 of the sleeve 205. The head 209 defines tabs or wings 272, 274 that extend radially outwardly in opposite directions. The tabs 272, 274 fit within the slots 216, 218 of the bracket 203. The tubular portion 208 has an aperture 228 therethrough which defines an inner wall 230 of the tubular portion 208. At the first end 211 of the sleeve 205, the inner wall 230 defines a first inner diameter. At a minimal distance from the first end 211 of the sleeve 205, the inner wall 230 tapers inwardly to provide a shoulder 232 and to define a second inner diameter, with the second inner diameter being smaller than the first inner diameter. From the shoulder 232 to a second end 213 of the sleeve 205, the inner wall 230 is slightly tapered or stepped such that the inner wall 230 at the second end 213 of the sleeve 205 defines a third inner diameter, with the third inner diameter being smaller than the second inner diameter, and such that the wall thickness of the tubular portion 208 is greater at the second end 213 of the sleeve 205 than proximate to where the shoulder 232 is provided.

An outer wall 236 of the tubular portion 208 extends from an undersurface 276 of the head 209 to the second end 213 of the sleeve 205. Lobes 240 extend outwardly from the outer wall 236 of the sleeve 205. The lobes 240 can be formed in many different configurations on the outer wall 236.

In operation, the bracket 203 is placed on a top surface 268 of a workpiece 266 having an aperture 264 such that the opening 227 of the bracket 203 is positioned in alignment with the aperture 264 of the workpiece 266. The tubular portion 208 of the sleeve 205 is then inserted through the opening 227 of the bracket 203 and into the aperture 264 of the workpiece 266. The aperture 264 has a diameter which is slightly larger than a diameter of the tubular portion 208 of the sleeve 205. The side walls 216, 218 of the bracket 203 are deflected to allow the tabs 272, 274 of the head 209 to be inserted into the slots 224, 226 of the side walls 216, 218.

The second end 260 of the stem 206 is then inserted into the aperture 228 of the sleeve 205 at the first end 211 thereof until the enlarged head portion 252 of the stem 206 comes into contact with the shoulder 232 of the inner wall 230 of the sleeve 205.

The nut 202 is then connected to the bracket 203 by deflecting outwardly the flanges 220, 222 and the side walls 216, 218 of the bracket 203 and inserting the tabs 248, 250 of the nut 202 into the slots 224, 226 of the side walls 216, 218 and on top of the tabs 272, 274 of the head 209 of the sleeve 205. The flanges 220, 222 and the side walls 216, 218 are then allowed to return to their normal position, thus connecting the nut 202 to the sleeve 205 and the bracket 203, allowing for floating movement of the nut 200 relative to the bracket 203 and the sleeve 205.

A holding or abutment force F1 is applied to a bottom surface 270 of the workpiece 266 and a tool (not shown) engages the tool engaging section 258 of the stem 206 and applies a force F2 to the stem 206 which is directed axially and in the opposite direction than the force F1 is applied to the workpiece 266. The force F2 on the stem 206 seats the sleeve 205 and the bracket 203 firmly against and within the workpiece 266.

Upon application of force F2 to the stem 206, the enlarged head portion 252 meets resistance from the shoulder 232 of the inner wall 230 such that the inner wall 230 is forced to expand radially outwardly as the enlarged head portion 252 deforms to the size of the expanded inner wall 230 with assistance from the cavity (not shown) in the enlarged head portion 252, if provided. As the inner wall 230 of the tubular portion 208 is inwardly tapered or stepped from the shoulder 232 to the second end 213 of the sleeve 205, the enlarged head stem 252 will consistently have an outer diameter which is larger than the diameter of the inner wall 230 of the tubular portion 208, even though the enlarged stem head 252 deforms to assume the geometry relevant to the size of the expanded inner wall 230 of the tubular portion 208. Thus, the axial force F2 applied to the enlarged stem head 252 will place a continuous exertion of radial expansion on the inner wall 230 of the tubular portion 208. As the inner wall 230 is continuously expanded by the enlarged head portion 252, the outer wall 236 of the tubular portion 208 expands radially outwardly in the aperture 264 against the wall of the workpiece 266, thus embedding the lobes 240 in the wall of the workpiece 266 in a fixed and intimate engagement with the wall of the aperture 264. When the enlarged head portion 252 is pulled completely through the aperture 228 of the tubular portion 208, the sleeve 205, and thus the bracket 203 and the nut 202 are attached to the workpiece 266 and the stem 206 can be discarded. A workpiece, such as a bolt, can then be attached to the nut plate 200.

The enlarged head portion 252 of stem 206 will initially expand the tubular portion 208 as well as place a compressive load on the components to seat them against the upper surface 268 of the workpiece 266. The tubular portion 208 will expand to engage the wall of the aperture 264 in the workpiece 266. As this occurs, radial forces are established which are sufficient to deform the head portion 252 radially. Thus, the head portion 252 can handle tolerance variations in the workpiece aperture 264, and will continuously deform the tubular portion 208 radially outward to engage the aperture wall with sufficient force to cause the lobes 240, or alternate structure, on the outer wall 236 of tubular portion 208 to embed in the wall of the aperture 264. As can be appreciated, the increasing wall thickness of the tubular portion 208 insures that radial deformation continues along the entire length of tubular portion 208 to attain the desired degree of engagement of the lobes 240 in the wall of the aperture 264.

Attention is now directed to the nut plate 300 of the third embodiment of the invention as illustrated in FIGS. 10–16. The nut plate 300 of the first embodiment includes a nut 302, a holding bracket 304, a stem 306 and a retainer 307. As the stem 306 is identical in structure to the stem 106 of the nut plate 100 of the first embodiment, this component will not be described again herein with the understanding that the description of the stem 306 is identical to the stem 106. Like reference numerals will denote like elements.

Figure 13:
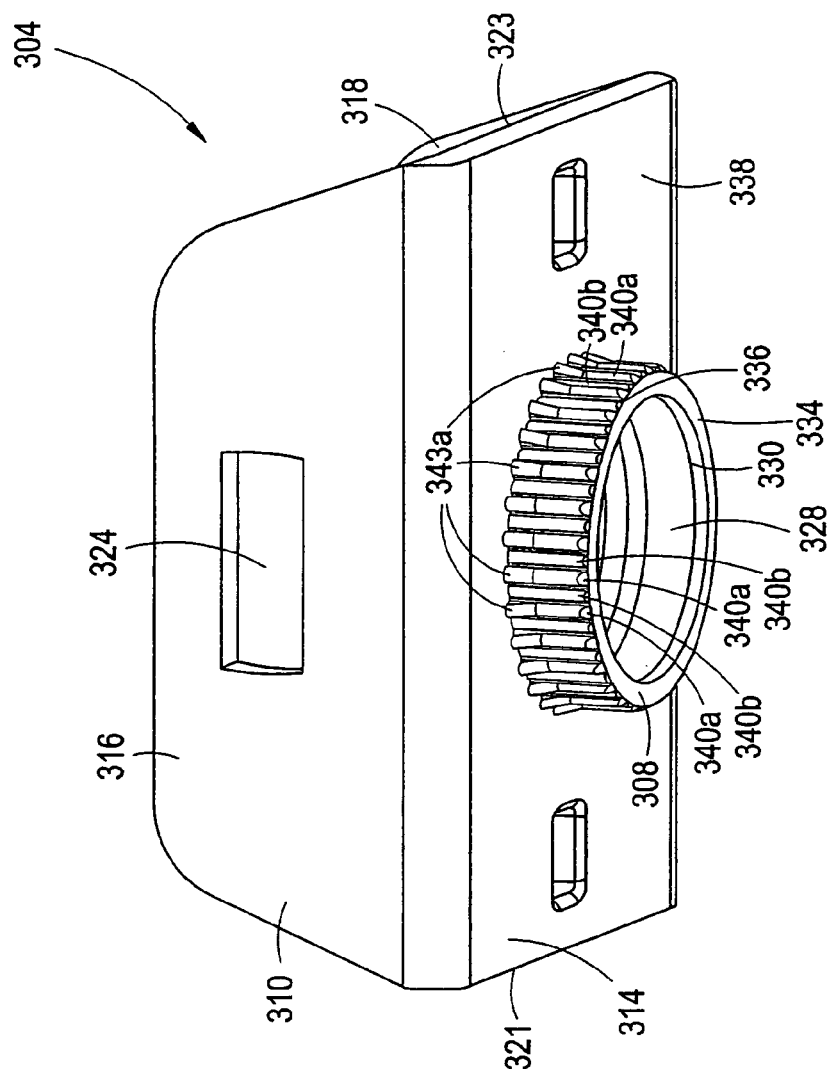
FIG. 13 is a bottom perspective view of the holding bracket of the nut plate of the third embodiment of the invention.
Figure 14:
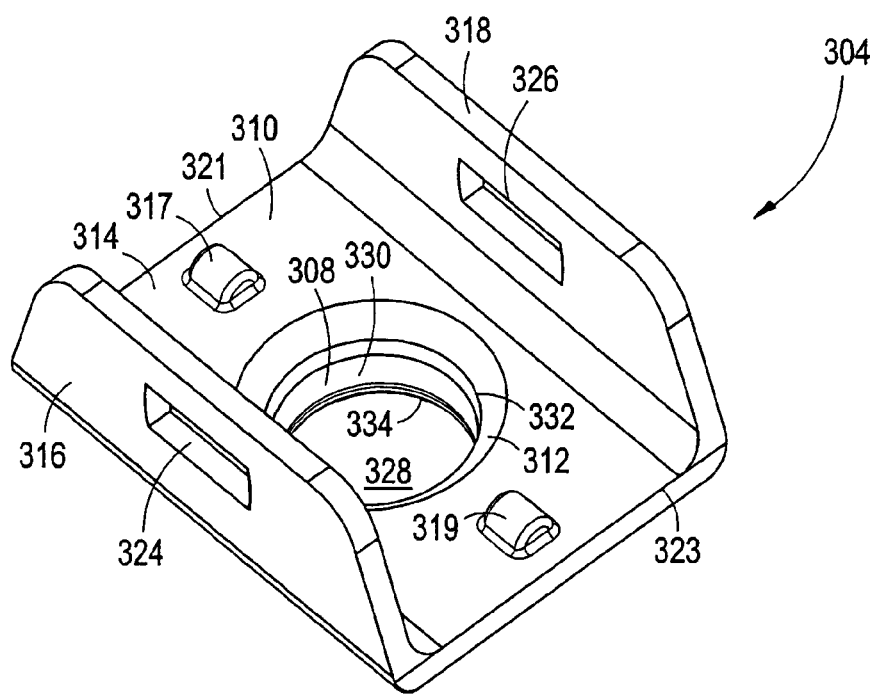
FIG. 14 is a top perspective view of the holding bracket of the nut plate of the third embodiment of the invention.
Figure 15:
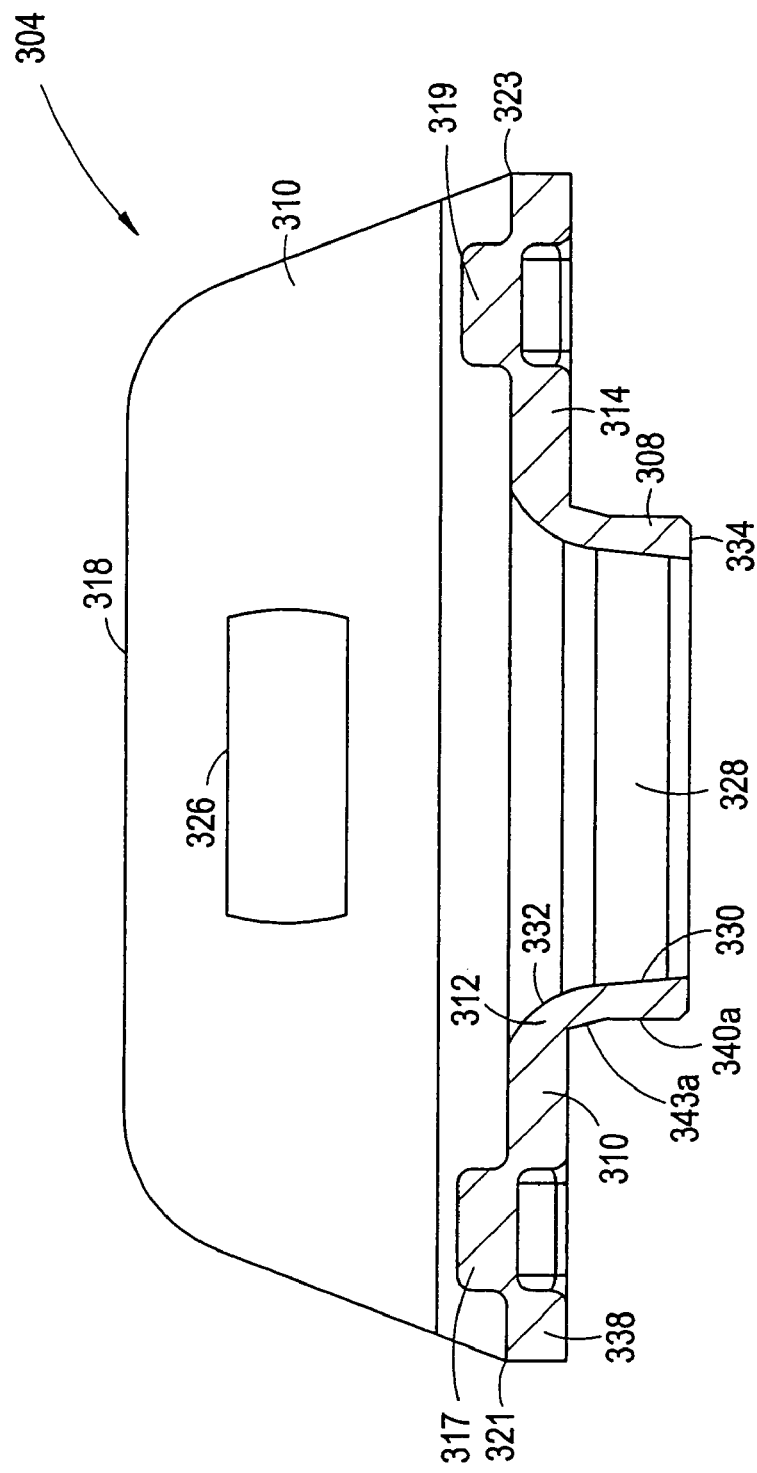
FIG. 15 is a side-elevational cross-sectional view of the holding bracket of the nut plate of the third embodiment of the invention.

As best illustrated in FIGS. 13–15, the holding bracket 304 is generally Y-shaped in side elevation and includes a tubular portion 308 and a bracket portion 310 which extends outwardly from the tubular portion 308 at a first end 312 thereof. The bracket portion 310 includes a base portion 314 and opposed upstanding side walls 316, 318. The base portion 314 has a pair of protrusions 317, 319 which protrude upwardly from the base portion 314. Protrusion 317 is provided proximate to edge 321 of the base portion 314 and protrusion 319 is provided proximate to edge 323 of the base portion 314. Slots 324, 326 extend through the side walls 316, 318 of the bracket portion 310.

The tubular portion 308 extends in the opposite direction from the base portion 314 of the bracket portion 310 than do the side walls 316, 318 and the protrusions 317, 319 of the bracket portion 310. As best illustrated in FIG. 15, the tubular portion 308 has an aperture 328 therethrough which defines an inner wall 330 of the tubular portion 308. The tubular portion 308 also has an outer wall 336. At the first end 312 of the tubular portion 308, the inner wall 330 defines a first inner diameter of the aperture 328. From the first end 312 of the tubular portion 308, the inner wall 330 curves inwardly to provide a shoulder 332 and to define a second inner diameter of the aperture 328 and thus a wall thickness of the tubular portion 308 between the outer wall 336 and the shoulder 332. The wall thickness of the tubular portion 308 between the outer wall 336 and the shoulder 332 is preferably 0.010 inches. The second inner diameter of the aperture 328 at the shoulder 332 of the tubular portion 308 is smaller than the first inner diameter of the aperture 328 at the first end 312 of the tubular portion 308. From the shoulder 332 to a second end 334 of the tubular portion 308, the inner wall 330 is tapered or stepped such that the inner wall 330 at the second end 334 of the tubular portion 308 defines a third inner diameter and thus a wall thickness of the tubular portion 308 at the second end 334 of the tubular portion 308. The wall thickness of the tubular portion 308 at the second end 334 of the tubular portion 308 is preferably 0.014 inches and, thus, is larger than the wall thickness of the tubular portion 308 between the outer wall 336 and the shoulder 332 of the tubular portion 308. The third inner diameter of the aperture 328 at the second end 334 of the tubular portion 308 is smaller than the second inner diameter of the aperture 328 at the shoulder 332 of the tubular portion 308.

The outer wall 336 of the tubular portion 308 extends from an undersurface 338 of the bracket portion 310 to the second end 334 of the tubular portion 308. Lobes or ribs 340 extend outwardly from the outer wall 336 of the tubular portion 308. The lobes 340 can be formed in many different configurations on the outer wall 336, but, preferably, the lobes 340 are formed as best illustrated in FIG. 13. As illustrated in FIG. 13, the lobes 340 are axially straight along the outer wall 336 such that they extend from the second end 334 of the tubular portion 308 to the undersurface 338 of the bracket portion 310. Two different types of lobes 340 are provided along the outer wall 336, namely high lobes 340a and low lobes 340b. The high lobes 340a extend outwardly from the outer wall 336 a greater distance than the low lobes 340b. The high lobes 340a and the low lobes 340b are alternated around the outer wall 336 such that each high lobe 340a is positioned between two low lobes 340b and each low lobe 340b is positioned between two high lobes 340a. Each of the high lobes 340a also preferably have an angled portion 343a proximate to the undersurface 338 of the bracket portion 310 such that the high lobes 340a extend outwardly further from the outer wall 336 proximate to the undersurface 338 of the bracket portion 310 than proximate to the second end 334 of the tubular portion 308. The purpose of the lobes 340a, 340b will be discussed in further detail herein.

Figure 16:
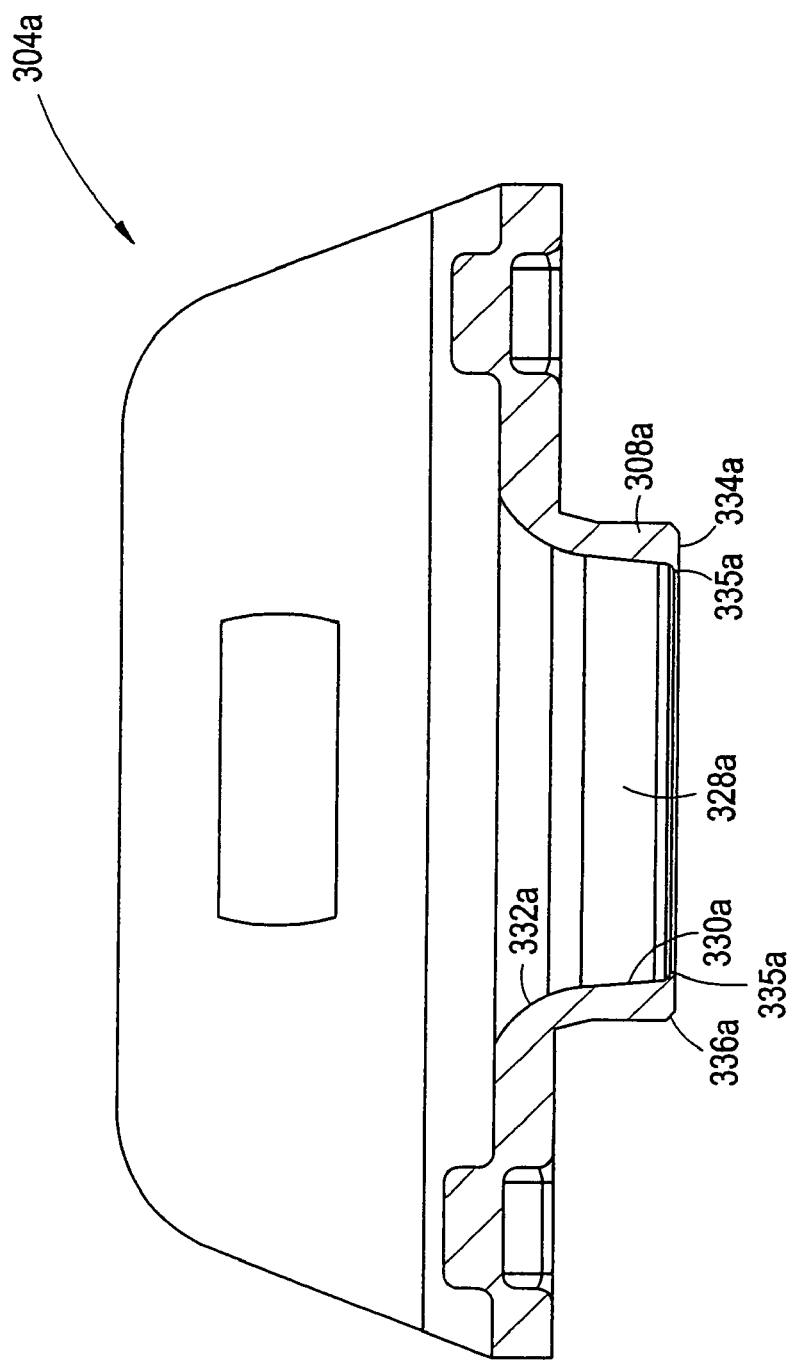
FIG. 16 is a side-elevational cross-sectional view of an alternative holding bracket of the nut plate of the third embodiment of the invention.

An alternative embodiment of the holding bracket 304a is illustrated in FIG. 16. The holding bracket 304a is identical to the holding bracket 304 except with regard to the inner wall 330a of the aperture 328a of the tubular portion 308a. The inner wall 330a of the holding bracket 304a has a lip 335a provided at the second end 334a of the tubular portion 308a which defines a fourth inner diameter and thus a wall thickness of the tubular portion 308a at the second end 334a of the tubular portion 308a. The wall thickness of the tubular portion 308a at the second end 334a is preferably larger than 0.014 inches (the wall thickness of the tubular portion 108 at the second end 334 of the tubular portion 308 of the holding bracket 304) and, thus, is larger than the wall thickness of the tubular portion 308a between the outer wall 336a and the shoulder 332a of the tubular portion 308a. The fourth inner diameter of the aperture 328a at the second end 334a of the tubular portion 308a is smaller than the second inner diameter of the aperture 328a at the shoulder 332a of the tubular portion 308a (as well as the third inner diameter of the aperture 328 at the shoulder 332 of the tubular portion 308 of the holding bracket 304). The purpose for providing the lip 335a will be discussed further herein.

Figure 10:
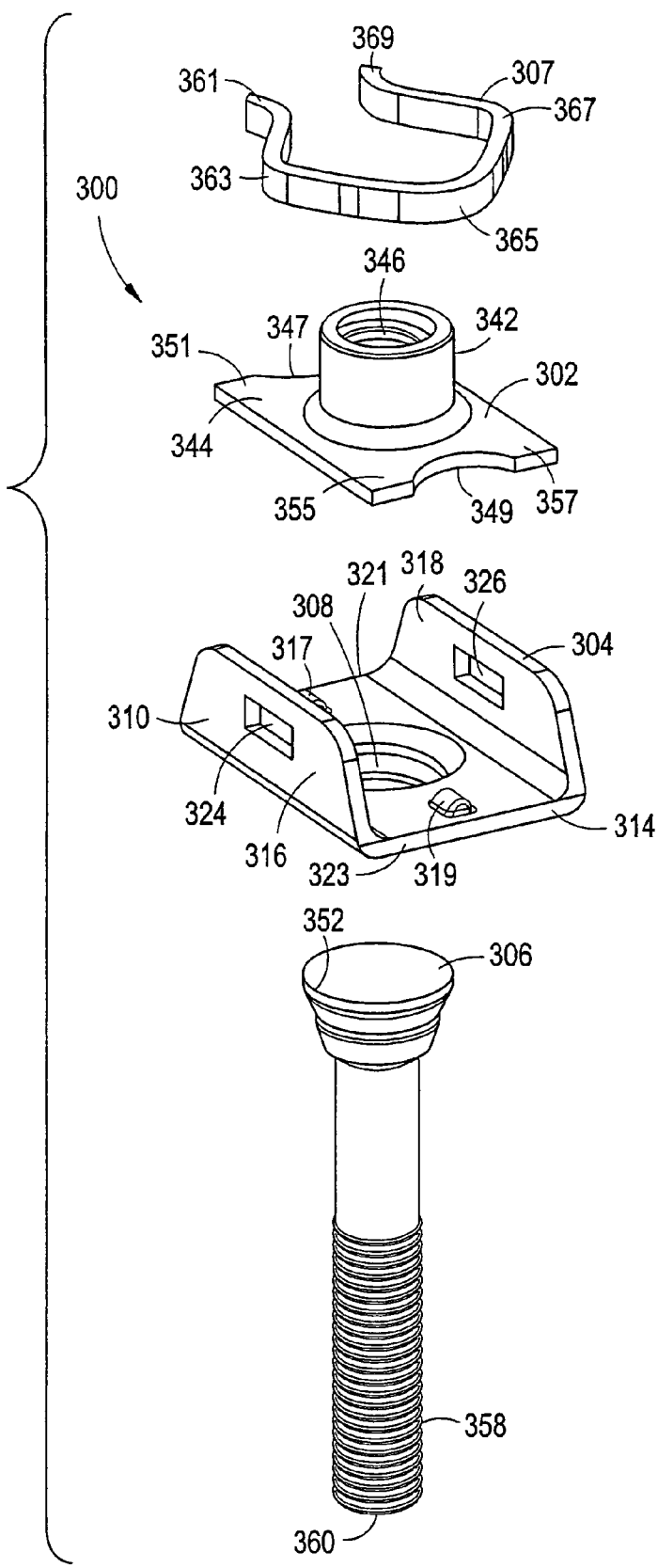
FIG. 10 is an exploded perspective view of the nut plate of a third embodiment of the invention.
Figure 11:
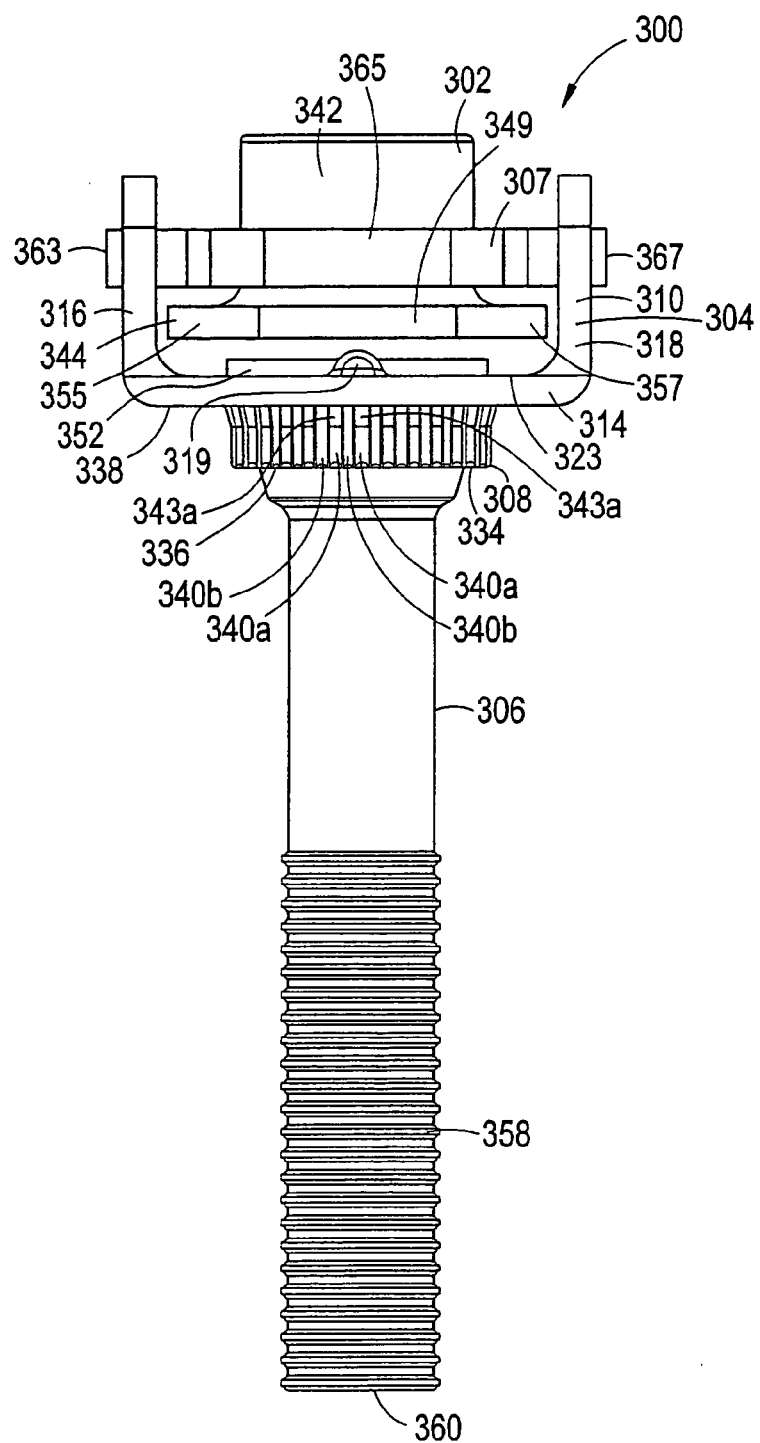
FIG. 11 is a side elevational view of the nut plate of the third embodiment of the invention.

As illustrated in FIGS. 10–12, the nut 302 includes a cylindrical portion 342 and a flat base portion 344 which extends outwardly from the cylindrical portion 342 at one end thereof. The cylindrical portion 342 has an aperture 346 therethrough which defines an inner diameter of the cylindrical portion 342. The cylindrical portion 342 at the inner diameter is generally threaded such that a workpiece, such as a bolt, can be attached thereto. The base portion 344 includes end recesses 347, 349 and axially projecting end portions 351, 353 and 355, 357 situated on opposite sides of the recesses 347, 349, respectively. The recesses 347, 349 and sized to accept the protrusions 317, 319 of the holding bracket 304.

As illustrated in FIGS. 10–12, the retainer 307 may be a spring formed from rectangular wire bent into the form illustrated. Retainer 307 is preferably one piece and extends from end portion 361 to side portion 363, then to middle portion 365, then to side portion 367, and then to end portion 369. The operation and purpose of the retainer 307 will be discussed further herein.

Figure 12A:
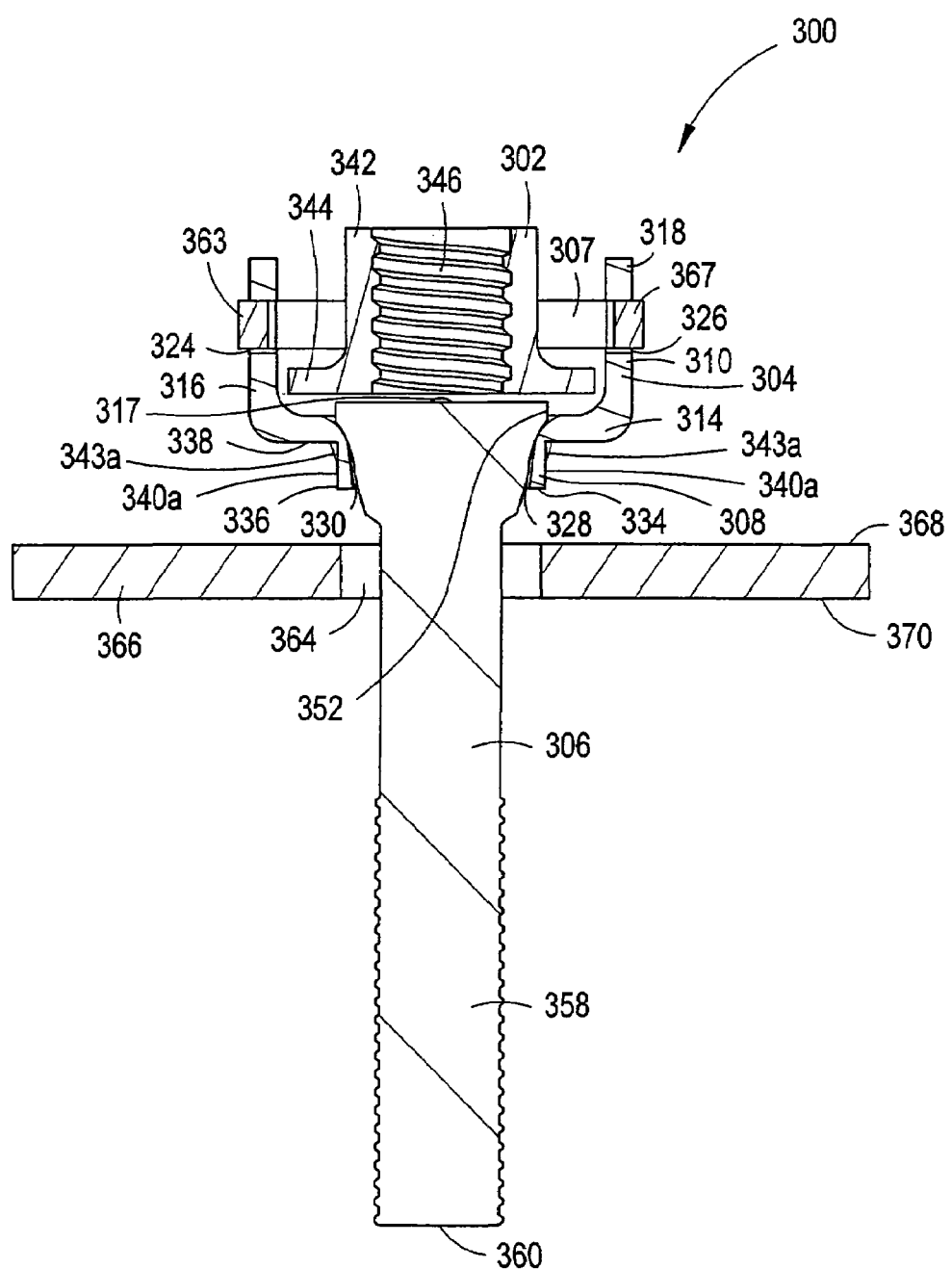

In operation, the second end 360 of the stem 306 is inserted into the aperture 328 of the tubular portion 308 of the holding bracket 304 at the first end 312 thereof until the enlarged head portion 352 of the stem 306 meets resistance from the shoulder 332 of the inner wall 330 of the tubular portion 308, as illustrated in FIG. 12a.

The nut 302 is then connected to the holding bracket 304 by placing the base portion 344 of the nut 302 against the base portion 314 of the bracket portion 310 such that the protrusions 317, 319 on the base portion 314 are positioned within the recesses 347, 349 of the nut 302. The retainer 307 is then attached to the bracket portion 310 to hold the nut 302 within the confines defined by the bracket portion 310 and the retainer 307, but such that the nut 302 is allowed to float both laterally and longitudinally to permit alignment of a workpiece, such as a bolt, with the nut 302.

The retainer 307 is attached to the bracket portion 310 by squeezing the end portions 361, 369 together until side portions 363, 367 are close enough together to fit in the space between the sidewalls 316, 318 of the holding bracket 304. The retainer 307 is then placed between the sidewalls 316, 318, with the side portions 363, 367 being aligned with the slots 324, 326. The squeeze force on end portions 361, 369 is then released, allowing the side portions 363, 367 to move outwardly and into the slots 324, 326, into the position shown in FIGS. 11–12.

The tubular portion 308 of the holding bracket 304 is then inserted into an aperture 364 of a workpiece 366, such that the undersurface 338 of the bracket portion 310 of the holding bracket 304 sits on a top surface 368 of the workpiece 366, as illustrated in FIG. 12b. The aperture 364 has a diameter which is slightly larger than a diameter of the tubular portion 308 of the holding bracket 304, which includes the lobes 340. The aperture 364 has a length which is preferably larger than or equal to a length of the tubular portion 308 of the holding bracket 304 such that the tubular portion 308 does not extend beyond the aperture 364 of the workpiece 366.

A holding or abutment force F1 is applied to a bottom surface 370 of the workpiece 366 and a tool (not shown) engages the tool engaging section 358 of the stem 306 and applies a force F2 to the stem 306 which is directed axially and in the opposite direction than the force F1 is applied to the workpiece 366, as illustrated in FIG. 12b. The force F2 on the stem 306 seats the tubular portion 308 and the bracket portion 310 of the holding bracket 304 firmly against and within the workpiece 366.

Upon application of force F2 to the stem 306, the enlarged head portion 352 meets resistance from the shoulder 332 of the inner wall 330 such that the inner wall 330 is forced to expand radially outwardly as the enlarged head portion 352 deforms to the size of the expanded inner wall 330, with assistance from the cavity (not shown) in the enlarged head portion 352, if provided. As the inner wall 330 of the tubular portion 308 is inwardly tapered or stepped from the shoulder 332 to the second end 334 of the tubular portion 308, the enlarged head stem 352 will consistently have an outer diameter which is larger than the diameter of the inner wall 330 of the tubular portion 308, even though the enlarged stem head 352 deforms to assume the geometry relevant to the size of the expanded inner wall 330 of the tubular portion 308. Thus, the axial force F2 applied to the enlarged stem head 352 will place a continuous exertion of radial expansion on the inner wall 330 of the tubular portion 308. As the inner wall 330 is continuously expanded by the enlarged head portion 352, the outer wall 336 of the tubular portion 308 continuously expands radially outwardly within the aperture 364 against the wall of the workpiece 366, thus embedding the lobes 340a, 340b in the wall of the workpiece 366 in a fixed and intimate engagement with the wall of the aperture 364.

The angled portions 343a of the lobes 340a embed further into the wall of the workpiece 366 in comparison to the remainder of the lobes 340a, to provide improved torque-out of the holding bracket 304. As the high lobes 340a embed into the wall of the workpiece 366, material of the workpiece 366 is displaced between high lobes 340a. The displaced material, however, does not always fill the space between the high lobes 340a and, therefore, the low lobes 340b are provided to both take up space and act as a seal with the wall of the workpiece 366.

Figure 12C:
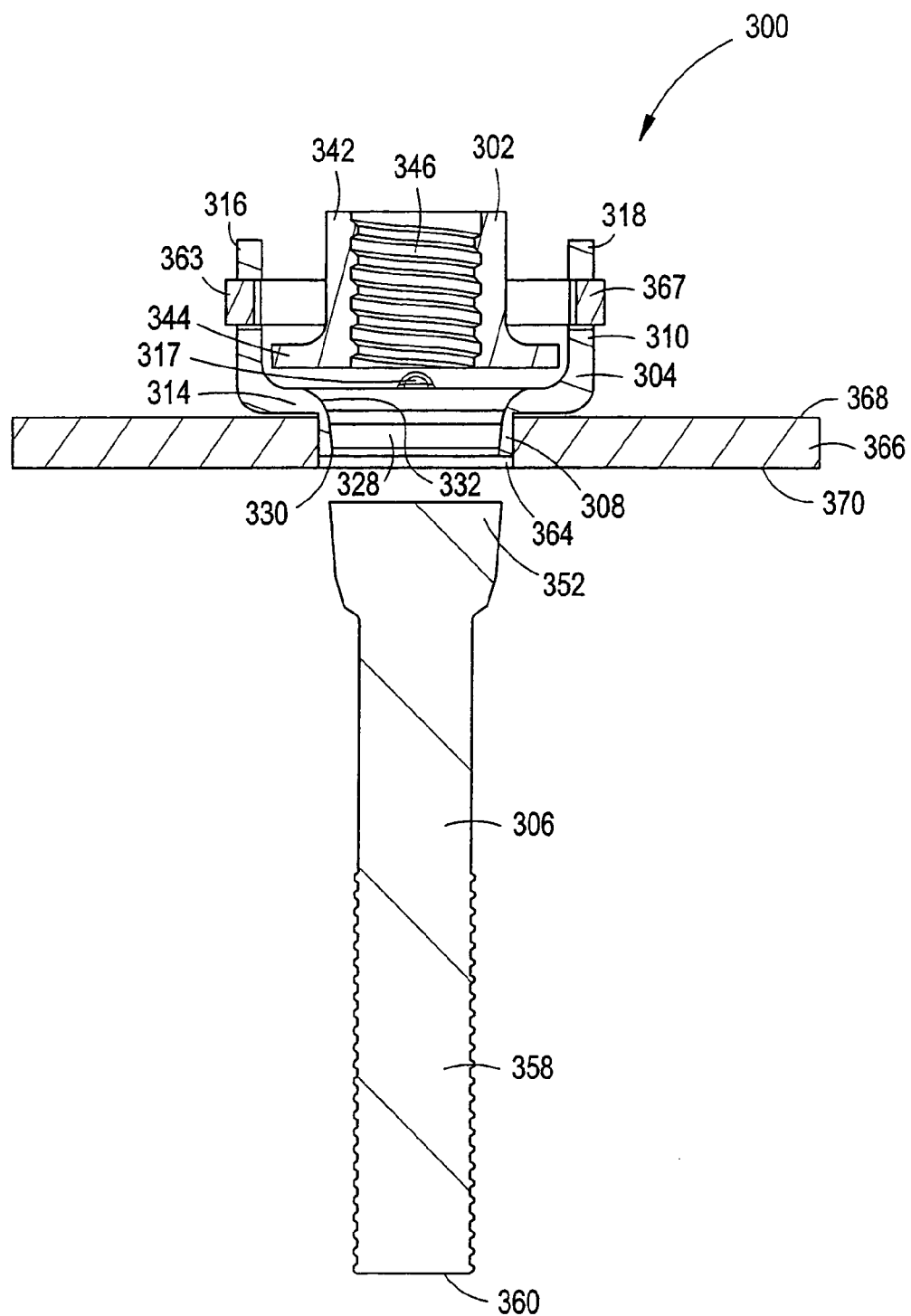

When the enlarged head portion 352 is pulled completely through the aperture 328 of the tubular portion 308, the holding bracket 304 is attached to the workpiece 366, as illustrated in FIG. 12c, and the stem 306 can be discarded. A workpiece, such as a bolt, can then be attached to the nut plate 300.

The enlarged head portion 352 of the stem 306 will initially expand the tubular portion 308 as well as place a compressive load on the components to seat them against the upper surface 368 of the workpiece 366. The tubular portion 308 will expand to engage the wall of the aperture 364 in the workpiece 366. As this occurs, radial forces are established which are sufficient to deform the head portion 352 radially. Thus, the head portion 352 can handle tolerance variations in the workpiece aperture 364, and will continuously deform the tubular portion 308 radially outward to engage the aperture wall with sufficient force to cause the lobes 340, or alternate structure, on the outer wall 336 of the tubular portion 308 to embed in the wall of the aperture 364. As can be appreciated, the increasing wall thickness of the tubular portion 308 insures that radial deformation continues along the entire length of tubular portion 308 to attain the desired degree of engagement of the lobes 340 in the wall of the aperture 364 such that improved torque-out, push-out and fatigue characteristics are achieved.

The alternative embodiment of the holding bracket 304a illustrated in FIG. 16 provides improved push-out characteristics over the holding bracket 304 as the holding bracket 304a includes the lip 335a provided at the second end 334a of the tubular portion 308a. As the lip 335a is provided, the stem 306 will push and embed even more material into the wall of the aperture 364 such that improved push-out characteristics are achieved.

The nut plates 100, 200, 300 of the embodiments of the present invention provide for a number of benefits over the nut plates of the prior art. Namely, the nut plates 100, 200, 300 have improved torque-out, push-out and fatigue characteristics in comparison to nut plates of the prior art; the nut plates 100, 200, 300 are lighter in weight than nut plates of the prior art, thus reducing operating cost; the nut plates 100, 200, 300 have an increased grip range, thus reducing fastener inventory; the nut plates 100, 200, 300 do not require counter-bore/countersink in the workpieces, thus providing for lower installation cost; the nut plates 100, 200, 300 do not require flaring, thus providing for lower installation cost; the nut plates 100, 200, 300 do not require any special aperture preparation, thus providing for lower installation cost; the nut plates 100, 200, 300 do not cause a gap to be formed between the tubular portions 108, 208, 308 and the wall of the workpiece 166, 266, 366; and the nut plates 100, 200, 300 make use of standard blind rivet installation tooling, thus lowering tool costs.

It should be noted, however, that flaring of the end of the tubular portions 108, 208, 308 could still be performed by lengthening the tubular portions 108, 208, 308 such that it extends beyond the length of the wall of the workpiece 166, 266, 366. Flaring of the ends of the tubular portions 108, 208, 308 would merely provide a further locking mechanism such that the nut plates 100, 200, 300 would have increased torque-out and push-out values.

It should also be noted that the connection of the nut 102, 202, 302 in each of the embodiments of the invention could be performed after the attachment of the tubular portion 108, 208, 308 to the wall of the aperture 164, 264, 364 of the workpiece 166, 266, 366 if desired, although this is not preferred.

The nut 102, 202, 302 can also be removed from the nut plate 100, 200, 300 upon wear thereof and replaced with a new nut 102, 202, 302 as desired.

While preferred embodiments of the invention are shown and described, it is envisioned that those skilled in the art may devise various modifications without departing from the spirit and scope of the foregoing description.

The invention claimed is:

1. A nut plate adapted to be attached to a wall defined by an aperture through a workpiece, said nut plate comprising:
  a nut having an aperture provided therethrough;
  a holding bracket including a tubular portion and a bracket portion, said tubular portion having a first end and a second end, said bracket portion extending from said first end of said tubular portion, said tubular portion including an outer wall and an inner wall, said outer wall extending from said first end of sad tubular portion to said second end of said tubular portion, said outer wall has a plurality of lobes extending outwardly therefrom, said plurality of lobes includes high lobes and low lobes, said high lobes extending further outwardly from said outer wall than said low lobes, each said high lobe has an angled portion proximate to an underside of said bracket portion such that each said high lobe extends further away from said outer wall proximate to said underside of said bracket portion than from said second end of said tubular portion, said inner wall extending from said first end of said tubular portion to said second end of said tubular portion, said inner wall being defined by an aperture extending through said tubular portion, said inner wall being tapered such that a diameter of said aperture at said first end of said tubular portion is larger than a diameter of said aperture at said second end of said tubular portion, said aperture of said tubular wall being in communication with said aperture of said nut;
  a stem having an enlarged head portion and an elongate portion extending therefrom, said stem being positioned within said aperture of said tubular portion, said enlarged head portion configured to move through said aperture of said tubular portion from said first end thereof to said second end thereof in order to expand said inner wall of said tubular portion upon axial movement of said stem such that said outer wall of said tubular portion is forced into engagement with the wall of the workpiece, said lobes capable of being embedded into the wall of the workpiece upon expansion of said inner wall by said stem; and means for securing said nut within said bracket portion, said securing means permitting limited movement of said nut within said bracket portion.

2. A nut plate as defined in claim 1, wherein:

said diameter at said first end of said tubular portion is substantially constant, said diameter at said second end of said tubular portion is substantially constant, and wherein said enlarged head portion is positioned to sit at least partially within said aperture of said tubular portion proximate to said first end thereof and has a generally complementary shape to said aperture of said tubular portion proximate to said first end thereof.

3. A nut plate as defined in claim 1, wherein said nut has a base portion and a portion extending upwardly from said base, said upwardly extending portion is cylindrical, said aperture provided through said nut defines an inner wall of said upwardly extending portion, said inner wall of said upwardly extending portion is threaded.

4. A nut plate as defined in claim 1, wherein said tubular portion of said holding bracket and said bracket portion of said holding bracket are integrally formed.

5. A nut plate as defined in claim 1, wherein said inner wall of said tubular portion further defines a shoulder proximate to said first end of said tubular portion, said diameter of said aperture at said first end of said tubular portion being larger than a diameter of said aperture at said shoulder and said diameter of said aperture at said shoulder being larger than said diameter of said aperture at said second end of said tubular portion.

6. A nut plate as defined in claim 5, wherein said enlarged head portion of said stem has a diameter which is larger than said diameter of said aperture at said shoulder but which is smaller than said diameter of said aperture at said first end of said tubular portion such that said enlarged head portion of said stem is capable of resting upon said shoulder.

7. A nut plate as defined in claim 1, wherein said inner wall further defines a lip at said second end of said tubular portion such that said diameter of said aperture at said second end of said tubular portion is reduced.

8. A nut plate as defined in claim 1, wherein each said lobe substantially extends from an underside of said bracket portion to said second end of said tubular portion.

9. A nut plate as defined in claim 1, wherein adjacent lobes are separated by a gap.

10. A nut plate as defined in claim 1, wherein said enlarged head portion of said stem is formed of a material which allows said enlarged head portion of said stem to deform to a geometrically relevant size such that said enlarged head portion continues to expand said inner wall of said tubular portion until said enlarged head portion exits said aperture of said tubular portion at said second end thereof.

11. A nut plate as defined in claim 10, wherein said enlarged head portion of said stem has a cavity provided therein, said cavity of said enlarged head portion capable of assisting in the deformation of said enlarged head portion.

12. A nut plate as defined in claim 1, wherein said bracket portion has a base portion which extends outwardly from said first end of said tubular portion and opposing sidewalls which project from said base portion in a direction opposite from said tubular portion, said opposing sidewalls defining a space for receiving said nut.

13. A nut plate as defined in claim 12, wherein each said sidewall of said bracket portion has a slot therethrough, and wherein said securing means includes a flexible retainer that fits over at least a portion of said nut and which includes portion which project into each of said slots of said opposing sidewalls.

14. A nut plate as defined In claim 13, wherein said base portion of said bracket portion has protrusions which project from said base portion of said bracket portion in a direction opposite of said tubular portion, and wherein at least a portion of said nut has opposite end recesses provided, said opposite end recesses capable of receiving said protrusions to limit movement of said nut relative to said bracket portion.

15. A nut plate as defined in claim 12, wherein said base portion of said nut has opposite ends having at least one tab member extending therefrom, and wherein said securing means includes at least one opening in each said sidewall for receiving a tab member of said nut.

16. A nut plate as defined in claim 15, wherein at least one of said sidewalls is formed of a flexible material such that said at least one sidewall can be flexed away front said other sidewall to allow said tab members of said nut to be received in said openings of said sidewalls.

17. A nut plate as defined in claim 16, wherein said holding bracket is separately formed of a bracket and a sleeve, said bracket having an opening therethrough and said opposing sidewalls with slots therethrough, and said sleeve having a tubular portion and an enlarged head at one end thereof, said tubular portion extending through said opening of said bracket such that said enlarged bead of said sleeve is positioned on said bracket, said enlarged head extending through said slots of said opposing sidewalls of tubular portion.

18. A nut plate as defined in claim 1, wherein said tubular portion has a length which is smaller than a length of the wall of the workpiece such that said second end of said tubular portion does not extend outside of the aperture of the workpiece.

19. A nut plate as defined in claim 1, wherein said inner wall has a periphery, said inner wall being tapered substantially continuously around said periphery.

20. A nut plate as defined in claim 19, wherein said inner wall is tapered round an entirety of said periphery.

21. A nut plate as defined in claim 1, wherein said diameter at said first end is constant, and wherein said diameter at said second end is constant.

22. A nut plate as defined in claim 1, wherein said securing means permits limited movement of said nut in three dimensions within said bracket portion.

23. A nut plate as defined in claim 1, wherein a lip portion extends substantially around said inner wall proximate to said second end such that a reduced diameter portion of said aperture is provided between said lip portion.

24. A nut plate adapted to be attached to a wall defined by an aperture through a workpiece, said nut plate comprising:

a nut having an aperture provided therethrough;

a holding bracket including a tubular portion and a bracket portion, said tubular portion having a first end and a second end, said bracket portion extending from said first end of said tubular portion, said tubular portion including an outer wall land an inner wall, said outer wall extending from said first end of sad tubular portion to said second end of said tubular portion, said outer wall has a plurality of lobes extending outwardly therefrom, said plurality of lobes includes high lobes and low lobes, said high lobes extending further outwardly from said outer wall than said low lobes, each said high lobe is positioned between two low lobes, each said low lobe is positioned between two high lobes, said inner wall extending from said first end of said tubular portion to said second end of said tubular portion, said inner wall being defined by an aperture extending through said tubular portion, said inner wall being tapered such that a diameter of said aperture at said first end of said tubular portion is larger than a diameter of said aperture at said second end of said tubular portion, said aperture of said tubular wall being in communication with said aperture or said nut;

a stem having an enlarged head portion and an elongate portion extending therefrom, said stem being positioned within said aperture of said tubular portion, said enlarged head portion configured to move through said aperture of said tubular portion from said first end thereof to said second end thereof in order to expand said inner wall of said tubular portion upon axial movement of said stem such that said outer wall of said tubular portion is forced into engagement with the wall of the workpiece, said lobes capable of being embedded into the wall of the workpiece upon expansion of said inner wall by said stem; and means for securing said nut within said bracket portion, said securing means permitting limited movement of said nut within said bracket portion.

25. A tubular portion of a nut plate which is adapted to be attached to a wall defined by an aperture through a workpiece, said tubular portion being sized to fit within the aperture of the workpiece, said tubular portion comprising:

an outer wall extending generally from a first end of said tubular portion to a second end of said tubular portion, said outer wall having a plurality of lobes extending outwardly therefrom, said plurality of lobes includes high lobes and low lobes, said high lobes extending further outwardly from said outer wall than said low lobes, each said high lobe has an angled portion proximate to said first end of said tubular portion such that each said high lobe extends further away from said outer wall proximate to said first end of said tubular portion than from said second end of said tubular portion; and an inner wall extending from said first end of said tubular portion to said second end of said tubular portion, said inner wall being defined by an aperture extending through said tubular portion, said inner wall being tapered such that a diameter of said aperture at said first end of said tubular portion is larger than a diameter of said aperture at said second end of said tubular portion;

said aperture of said tubular portion capable of receiving a stem therethrough for expanding said inner wall of said tubular portion such that said outer wall of said tubular portion is forced into engagement with the wall of the workpiece, said lobes capable of being embedded into the wall of the workpiece upon expansion of said inner wall by said stem.

26. A tubular portion of a nut plate which is adapted to be attached to a wall defined by an aperture through a workpiece, said tubular portion being sized to fit within the aperture of the workpiece, said tubular portion comprising an outer wall extending generally from a first end of said tubular portion to a second end of said tubular portion, said outer wall having a plurality of lobes extending outwardly therefrom, said plurality of lobes includes high lobes and low lobes, said high lobes extending further outwardly from said outer wall than said low lobes, each said high lobe is positioned between two low lobes, each said low lobe is positioned between two high lobes; and an inner wall extending from said first end of said tubular portion to said second end of said tubular portion, said inner wall being defined by an aperture extending through said tubular portion, said inner wall being tapered such that a diameter of said aperture at said first end of said tubular portion is larger than a diameter of said aperture at said second end of said tubular portion;

said aperture of said tubular portion capable of receiving a stem therethrough for expanding said inner wall of said tubular portion such that said outer wall of said tubular portion is forced into engagement with the wall of the workpiece, said lobes capable of being embedded into the wall of the workpiece upon expansion of said inner wall by said stem.

27. A tubular portion of a nut plate which is adapted to be attached to a wall defined by an aperture through a workpiece, said tubular portion being sized to fit within the aperture of the workpiece, said tubular portion comprising:

an outer wall extending from a first end of said tubular portion to a second end of said tubular portion, said outer wall having a plurality of lobes extending outwardly therefrom, at least a portion of said lobes having an angled portion proximate to said first end of said tubular portion such that each said lobe having an angled portion extends further away from said outer wall proximate to said first end of said tubular portion than from said second end of said tubular portion, said plurality of lobes includes high lobes and low lobes, said high lobes extending further outwardly from said outer wall than said low lobes, each said high lobe has said angled portion proximate to said first end of said tubular portion such that each said high lobe extends further away from said outer wall proximate to said first end of said tubular portion than from said second end of said tubular portion; and an inner wall extending from said first end of said tubular portion to said second end of said tubular portion, said inner wall being defined by an aperture extending through said tubular portion;

said aperture of said tubular portion capable of receiving a stem therethrough for expanding said inner wall of said tubular portion such that said outer wall of said tubular portion is forced into engagement with the wall of the workpiece, said lobes capable of being embedded into the wall of the workpiece upon expansion of said inner wall by the stem.

28. A tubular portion as defined in claim 27, wherein said inner wall is defined by an aperture extending through said tubular portion, said inner wall being tapered such that a diameter of said aperture at said first end of said tubular portion is larger than a diameter of said aperture at said second end of said tubular portion, said diameter at said first end being substantially constant, said diameter at said second end being substantially constant, said inner wall further defining a shoulder proximate to said first end of said tubular portion such that said diameter of said aperture at said first end of said tubular portion is larger than a diameter of said aperture at said shoulder and such that said diameter of said aperture at said shoulder is larger than said diameter of said aperture at said second end of said tubular portion and wherein said aperture of said tubular portion is generally complementary in shape to said aperture of said tubular portion proximate to said shoulder and said first end thereof.

29. A tubular portion as defined in claim 27, wherein each said lobe substantially extends from proximate to said first end of said tubular portion to said second end of said tubular portion.

30. A tubular portion as defined in claim 27, wherein adjacent lobes are separated by a gap.

31. A tubular portion as defined in claim 27, wherein said tubular portion has a length which is smaller than a length of the wall of the workpiece such that said second end of said tubular portion does not extend outside of the aperture of the workpiece.

32. A tubular portion as defined in claim 27, wherein said inner wall is tapered inwardly from said first end of said tubular portion to said second end of said tubular portion such that said aperture of said tubular portion at said second end thereof has a diameter which is larger than a diameter of said aperture of said tubular portion at said second end thereof.

33. A tubular portion as defined in claim 27, wherein said inner wall has a periphery, said inner wall being tapered substantially continuously around said periphery.

34. A tubular portion as defined in claim 33, wherein said inner wall is tapered around an entirety of said periphery.

35. A tubular portion as defined in claim 27, wherein said diameter at said first end is constant, and wherein said diameter at said second end is constant.

36. A tubular portion as defined in claim 27, wherein a lip portion extends substantially around said inner wall proximate to said second end such that a reduced diameter portion of said aperture is provided between said lip portion.

37. A tubular portion of a nut plate which is adapted to be attached to a wall defined by an aperture through a workpiece, said tubular portion being sized to fit within the aperture of the workpiece, said tubular portion comprising:

an outer wall extending from a first end of said tubular portion to a second end of said tubular portion, said outer wall having a plurality of lobes extending outwardly therefrom, at least a portion of said lobes having an angled portion proximate to said first end of said tubular portion such that each said lobe having an angled portion extends further away from said outer wall proximate to said first end of said tubular portion than from said second end of said tubular portion, said plurality of lobes includes high lobes and low lobes, said high lobes extending further outwardly from said outer wall than said low lobes, each said high lobe is positioned between two low lobes, each said low lobe is positioned between two high lobes; and an inner wall extending from said first end of said tubular portion to said second end of said tubular portion, said inner wall being defined by an aperture extending through said tubular portion;

said aperture of said tubular portion capable of receiving a stem therethrough for expanding said inner wall of said tubular portion such that said outer wall of said tubular portion is forced into engagement with the wall of the workpiece, said lobes capable of being embedded into the wall of the workpiece upon expansion of said inner wall by the stem.

38. A tubular portion as defined in claim 37, wherein said inner wall is tapered inwardly from said first end of said tubular portion to said second end of said tubular portion such that said aperture of said tubular portion at said first end thereof has a diameter which is larger than a diameter of said aperture of said tubular portion at said second end thereof.

39. A preassembled nut plate comprising:

a holding bracket including a tubular portion and a bracket portion, said tubular portion having first and second ends with said bracket portion extending from said first end of said tubular portion, said tubular portion including an outer wall and an inner wall which both extend from said first end of said tubular portion to said second end of said tubular portion, said outer wall has a plurality of lobes extending outwardly therefrom, said plurality of lobes includes high lobes and low lobes, said high lobes extending further outwardly from said outer wall than said low lobes, each said high lobe has an angled portion proximate to an underside of said bracket portion such that each said high lobe extends further away from said outer wall proximate to said underside of said bracket portion than from said second end of said tubular portion, said inner wall defining an aperture which extends through said tubular portion, said inner wall being tapered such that a diameter of said aperture at said first end of said tubular portion is larger than a diameter of said aperture at said second end of said tubular portion, said diameter at said first end being substantially constant, said diameter at said second end being substantially constant;

a stem having an enlarged head portion and an elongate portion extending therefrom, said enlarged head portion being positioned to sit at least partially within said aperture of said tubular portion proximate to said first end thereof and having a generally complementary shape to said aperture of said tubular portion proximate to said first end thereof, said elongate portion extending through said tubular portion and beyond said second end of said tubular portion such that said enlarged head portion is configured to move through said aperture of said tubular portion from said first end thereof to said second end thereof in order to expand said inner wall of said tubular portion upon axial movement of said stem;

a nut member having an aperture therethrough, said nut member being positioned within said bracket portion; and means for securing said nut member within said bracket portion, said securing means permitting limited movement of said nut member within said bracket portion, said securement of said nut member within said bracket portion preventing substantial movement of said stem such that said stem cannot be removed from said tubular portion through said bracket portion.

40. A preassembled nut plate as defined in claim 39, wherein said tubular portion and said bracket portion of said holding bracket are integrally formed.

41. A preassembled nut plate as defined in claim 39, wherein said aperture provided through said tubular portion defines an inner wall of said tubular portion, said inner wall of said tubular portion defining a shoulder proximate to said first end of said tubular portion such that a diameter of said aperture at said first end of said tubular portion is larger than a diameter of said aperture at said shoulder.

42. A preassembled nut plate as defined in claim 41, wherein said enlarged head portion of said stem has a diameter which is larger than said diameter of said aperture at said shoulder but which is smaller than said diameter of said aperture at said first end of said tubular portion such that said enlarged head portion of said stem is capable of resting upon said shoulder.

43. A preassembled nut plate as defined in claim 39, wherein said bracket portion has a base portion which extends outwardly from said first end of said tubular portion and opposing sidewalls which project from said base portion in a direction opposite from said tubular portion, said opposing sidewalls defining a space for positioning said nut member.

44. A preassembled nut plate as defined in claim 43, wherein each said sidewall of said bracket portion has a slot therethrough, and wherein said securing means includes a flexible retainer that fits over at least a portion of said nut member and which includes portions which project into each of said slots of said opposing sidewalls.

45. A preassembled nut plate as defined in claim 44, wherein said base portion of said bracket portion has protrusions which project from said base portion of said bracket portion in a direction opposite of said tubular portion, and wherein at least a portion of said nut member has opposite end recesses provided, said opposite end recesses capable of receiving said protrusions to limit movement of said nut member relative to said bracket portion.

46. A preassembled nut plate as defined in claim 43, wherein said base portion of said nut member has opposite ends having at least one tab member extending therefrom, and wherein said securing means includes at least one opening in each said sidewall for receiving a tab member of said nut member.

47. A preassembled nut plate as defined in claim 46, wherein at least one of said sidewalls is formed of a flexible material such that said at least one sidewall can be flexed away from said other sidewall to allow said tab members of said nut member to be received in said openings of said sidewalls.

48. A preassembled nut plate as defined in claim 39, wherein said inner wall has a periphery, said inner wall being tapered substantially continuously around said periphery.

49. A preassembled nut plate as defined in claim 48, wherein said inner wall is tapered around an entirety of said periphery.

50. A preassembled nut plate as defined in claim 39, wherein said diameter at said first end is constant, and wherein said diameter at said second end is constant.

51. A preassembled nut plate as defined in claim 39, wherein said securing means permits limited movement of said nut in three dimensions within said bracket portion.

52. A preassembled nut plate as defined in claim 39, wherein a lip portion extends substantially around said inner wall proximate to said second end such that a reduced diameter portion of said aperture is provided between said lip portion.

53. A preassembled nut plate comprising:

a holding bracket including a tubular portion and a bracket portion, said tubular portion having first and second ends with said bracket portion extending from said first end of said tubular portion, said tubular portion including an outer wall and an inner wall which both extend from said first end of said tubular portion to said second end of said tubular portion, said outer wall has a plurality of lobes extending outwardly therefrom, said plurality of lobes includes high lobes and low lobes, said high lobes extending further outwardly from said outer wall than said low lobes, each said high lobe is positioned between two low lobes, each said low lobe is positioned between two high lobes, said inner wall defining an aperture which extends through said tubular portion, said inner wall being tapered such that a diameter of said aperture at said first end of said tubular portion is larger than a diameter of said aperture at said second end of said tubular portion, said diameter at said first end being substantially constant, said diameter at said second end being substantially constant;

a stem having an enlarged head portion and an elongate portion extending therefrom, said enlarged head portion being positioned to sit at least partially within said aperture of said tubular portion proximate to said first end thereof and having a generally complementary shape to said aperture of said tubular portion proximate to said first end thereof, said elongate portion extending through said tubular portion and beyond said second end of said tubular portion such that said enlarged head portion is configured to move through said aperture of said tubular portion from said first end thereof to said second end thereof in order to expand said inner wall of said tubular portion upon axial movement of said stem;

a nut member having an aperture therethrough, said nut member being positioned within said bracket portion; and means for securing said nut member within said bracket portion, said securing means permitting limited movement of said nut member within said bracket portion, said securement of said nut member within said bracket portion preventing substantial movement of said stem such that said stem cannot be removed from said tubular portion through said bracket portion.

* * * * *

UNITED STATES PATENT AND TRADEMARK OFFICE
CERTIFICATE OF CORRECTION

PATENT NO. : 7,059,816 B2
APPLICATION NO. : 10/272721
DATED : June 13, 2006
INVENTOR(S) : Rahmatollah F. Toosky It is certified that error appears in the above-identified patent and that said Letters Patent is hereby corrected as shown below:

Column 16, Line 7 "portion" should be -- portions --
Column 16, Line 9 "In" should be -- in --
Column 16, Line 24 " front" should be -- from --
Column 16, Line 33 "bead" should be -- head --
Column 16, Line 64 "land" should be -- and --
Column 17, Line 14 "or" should be -- of --
Column 19, Line 18 "second" should be -- first --

Signed and Sealed this

Nineteenth Day of December, 2006

JON W. DUDAS
*Director of the United States Patent and Trademark Office*